US012734378B2

(12) United States Patent
Fay, III et al.

(10) Patent No.: US 12,734,378 B2
(45) **Date of Patent: *Sep. 15, 2026**

(54) PERSONAL PROTECTIVE ANTI-VIRAL FACE MASK

(71) Applicant: Iowa State University Research Foundation, Inc., Ames, IA (US)

(72) Inventors: James E. Fay, III, Boulder, CO (US); Richard Dennis Vigil, Ames, IA (US); John A. Soderquist, Dorado, PR (US); Andrew S. Heller, Ames, IA (US); Trung Lo Deo, Urbandale, IA (US); Cameron Lynch, Iowa City, IA (US); Danilo R. Manfre, West Des Moines, IA (US); Beate Schmittmann, Ames, IA (US)

(73) Assignee: lowa State University Research Foundation, Inc., Ames, IA (US)

( * ) Notice: Subject to any disclaimer, the term of this patent is extended or adjusted under 35 U.S.C. 154(b) by 497 days.

This patent is subject to a terminal disclaimer.

(21) Appl. No.: 18/030,443

(22) PCT Filed: Sep. 20, 2021

(86) PCT No.: PCT/US2021/051080

§ 371 (c)(1),
(2) Date: Apr. 5, 2023

(87) PCT Pub. No.: WO2022/076152

PCT Pub. Date: Apr. 14, 2022

(65) Prior Publication Data

US 2023/0372747 A1 Nov. 23, 2023

Related U.S. Application Data

(63) Continuation of application No. 17/103,501, filed on Nov. 24, 2020, now Pat. No. 11,123,584.

(Continued)

(51) Int. Cl.
*A62B 23/02* (2006.01)
*A41D 13/11* (2006.01)

(Continued)

(52) U.S. Cl.
CPC .............. *A62B 23/02* (2013.01); *A41D 13/11* (2013.01); *A62B 7/10* (2013.01); *A62B 18/025* (2013.01);

(Continued)

(58) Field of Classification Search
CPC ...................................................... B01D 39/04
See application file for complete search history.

(56) References Cited

U.S. PATENT DOCUMENTS 4,856,509 A 8/1989 Lemelson
6,408,845 B1 6/2002 Pereira et al.

(Continued)

FOREIGN PATENT DOCUMENTS

AU 2020100503 A4 5/2020
CN 2335652 U 9/1999

(Continued)

OTHER PUBLICATIONS

Chengzhong Cui et al., "Synthesis and Solvent-Dependent Micellization of the Amphiphilic Block Copolymer Poly (styreneboronic acid)-block-Polystyrene", Journal of Polymer Science: Part A: Polymer Chemistry, 2010, vol. 48, 2438-2445.

(Continued)

*Primary Examiner* — Kevin Joyner
(74) *Attorney, Agent, or Firm* — Nyemaster Goode P.C.

(57) ABSTRACT

An entrainment-based filtering system for use in connection with a facemask or respirator that includes: a filter housing defining an interior volume comprising at least one airflow pathway having an airflow pathway length that is longer than the length of the interior volume and spaced within the interior volume; and a plurality of entrainment substrates. The plurality of entrainment substrates is positioned within the at least one airflow pathway and the plurality of substrates and the dimensions of the at least one airflow pathway together function to entrain particles on the surface of the chemically coated entrainment substrates and prevent at least 95% of particles traveling through the at least one airflow pathway from exiting the entrainment-based filter.

20 Claims, 22 Drawing Sheets

Related U.S. Application Data

(60) Provisional application No. 63/087,658, filed on Oct. 5, 2020.

(51) Int. Cl.

| | |
|---|---|
| ***A61L 9/00*** | (2006.01) |
| ***A62B 7/10*** | (2006.01) |
| ***A62B 18/02*** | (2006.01) |
| ***B01D 39/04*** | (2006.01) |
| ***B01D 39/08*** | (2006.01) |
| ***B01D 46/00*** | (2022.01) |
| ***B01D 46/24*** | (2006.01) |

(52) U.S. Cl.
CPC ......... *B01D 39/08* (2013.01); *B01D 46/0028* (2013.01); *B01D 46/0036* (2013.01); *B01D 46/0041* (2013.01); *B01D 46/2411* (2013.01); *B01D 2239/0407* (2013.01); *B01D 2239/0442* (2013.01); *B01D 2239/0478* (2013.01); *B01D 2239/0618* (2013.01); *B01D 2279/65* (2013.01)

(56) References Cited

U.S. PATENT DOCUMENTS

| | | | | |
|---|---|---|---|---|
| 6,860,267 | B2 | 3/2005 | Capon et al. | |
| 7,559,968 | B2 | 7/2009 | Bolduc | |
| 7,872,051 | B2 | 1/2011 | Clarke | |
| 8,091,551 | B2 | 1/2012 | Messier | |
| 8,182,568 | B2 | 5/2012 | Volo et al. | |
| 8,460,423 | B2 | 6/2013 | Legare et al. | |
| 8,512,434 | B2 | 8/2013 | Stelter et al. | |
| 9,186,472 | B2 | 11/2015 | Cozean et al. | |
| 9,269,042 | B2 | 2/2016 | Friedman et al. | |
| 10,543,333 | B2 | 1/2020 | Ng et al. | |
| 10,576,227 | B2 | 3/2020 | Kenyon et al. | |
| 2006/0222621 | A1* | 10/2006 | Kuhn .................. | B01J 20/3242 424/76.2 |
| 2009/0084384 | A1 | 4/2009 | Cheng et al. | |
| 2009/0274936 | A1* | 11/2009 | Goldstein ............ | B01D 53/885 423/247 |
| 2010/0018533 | A1 | 1/2010 | Biedermann et al. | |
| 2010/0040655 | A1 | 2/2010 | Ren et al. | |
| 2010/0239625 | A1 | 9/2010 | Puckett et al. | |
| 2011/0132373 | A1 | 6/2011 | Freriks | |
| 2013/0302395 | A1 | 11/2013 | Andrews et al. | |
| 2016/0113336 | A1 | 4/2016 | Shibata et al. | |
| 2016/0174631 | A1 | 6/2016 | Tong et al. | |
| 2016/0317771 | A1 | 11/2016 | Klee et al. | |
| 2017/0240709 | A1 | 8/2017 | Willard et al. | |
| 2017/0281993 | A1 | 10/2017 | O et al. | |
| 2018/0154193 | A1* | 6/2018 | Stinzendoerfer .. | B01D 53/0415 |
| 2019/0336799 | A1 | 11/2019 | Montgomery et al. | |
| 2020/0009281 | A1* | 1/2020 | Fosdick ............... | A01K 1/0155 |
| 2020/0061399 | A1 | 2/2020 | Wade | |
| 2020/0179547 | A1 | 6/2020 | Choi | |
| 2020/0323292 | A1 | 10/2020 | Chiang | |

FOREIGN PATENT DOCUMENTS

| | | | |
|---|---|---|---|
| CN | 109862798 | A | 6/2019 |
| JP | 2005198676 | A | 7/2005 |
| KR | 20040086873 | A | 10/2004 |
| RU | 2644316 | C1 | 2/2018 |
| UA | 57503 | U | 2/2011 |

OTHER PUBLICATIONS

Gadi Borkow et al., "A Novel Anti-Influenza Copper Oxide Containing Respiratory Face Mask", Plos One, Jun. 2010, vol. 5, Issue 6, 8 pages.

Yejin Kim, Vitamin C Is an Essential Factor on the Anti-viral Immune Responses through the Production of Interferon-a/ at the Initial Stage of Influenza A Virus (H3N2) Infection, Immune Network, Apr. 2013, vol. 13, No. 2, pp. 70-74.

R.B. Bird et al., "Introductory Transport Phenomena", John Wiley & Sons, 2015, pp. 175-184.

Ariana Eunjung Cha, "Forty percent of people with coronavirus infections have no symptoms. Might they be the key to ending the pandemic?", The Washington Post, https://www.washingtonpost.com/health/2020/08/08/asymptomatic-coronavirus-covid/, Aug. 8, 2020, 11 pages.

Dailyhealthpost Editorial, Vitamin C Can Kill Almost Every Virus Known to Mankind, https://dailyhealthpost.com/vitamin-c-anti-virus/, Jun. 18, 2020, 4 pages.

Damien Downing et al., "Vitamin C and COVID-19 Coronavirus," https://orthomolecular.org/resources/omns/v16n14.shtml, published Feb. 28, 2020, 3 pages.

Dr. Malcolm Kendrick, "Coronavirus [COVID-19]", https://drmalcolmkendrick.org/2020/03/18/coronavirus-covid-19/, published Mar. 18, 2020, 263 pages.

Dyani Lewis, "Mounting evidence suggests coronavirus is airborne—but health advice has not caught up", https://www.nature.com/articles/d41586-020-02058-1, Jul. 9, 2020, 12 pages.

Dub@iRx, China Treating Coronavirus COVID-19 with Intravenous Vitamin C, https://fusionrxdubai.com/china-treating-coronavirus-covid-19-with-intravenous-vitamin-c/, Mar. 22, 2020, 5 pages.

Khaleda Rahman, "Antiviral Mask to Kill Coronavirus on Contact in Development by Researchers", Newsweek, https://www.newsweek.com/antiviral-mask-kill-coronavirus-development-1504622, May 17, 2020, 12 pages.

Matt Brown, "Fact check: Could taking vitamin C cure or prevent—COVID-19?", https://www.usatoday.com/story/news/factcheck/2020/03/24/coronavirus-fact-check-could-vitamin-c-cure-covid-19/2904303001/, USA Today, published Mar. 24, 2020, 4 pages.

Ricki Lewis, PHD, "COVID-19 Vaccine Will Close in on the Spikes", https://dnasceince.plos.org/2020/02/20/covid-19-vaccine-will-close-in-on-the-spikes/, published on Feb. 20, 2020, 9 pages.

Rosie Mccall, New York Hospitals Are Using Vitamin C to Treat Some Coronavirus Patients, https://www.newsweek.com/new-york-hospitals-vitamin-c-coronavirus-patients-1494407, Mar. 26, 2020, 14 pages.

International Searching Authority, "International Search Report and Written Opinion," issued in connection with PCT/US2021/051080, dated Mar. 17, 2022, 24 pages.

Wikipedia, Angiotensin-converting enzyme 2, https://en.wikipedia.org/wiki/Angiotensin-converting_enzyme_2, Feb. 5, 2021, 9 pages.

* cited by examiner

PERSONAL PROTECTIVE ANTI-VIRAL FACE MASK

CROSS-REFERENCE TO RELATED APPLICATIONS

This application is a national stage application, filed under 35 U.S.C. § 371, of International Patent Application No. PCT/US2021/051080, entitled "PERSONAL PROTECTIVE ANTI-VIRAL FACE MASK" filed on Sep. 20, 2021, which is incorporated by reference herein in its entirety. International Patent Application No. PCT/US2021/051080 is an International Patent Application that claims priority to and the benefit of: (1) U.S. patent application Ser. No. 17/103,501, filed on Nov. 24, 2020, entitled "PERSONAL PROTECTIVE ANTI-VIRAL FACE MASK," now U.S. Pat. No. 11,123,584, which is incorporated by reference herein in its entirety, and (2) U.S. Provisional Patent Application Ser. No. 63/087,658, filed on Oct. 5, 2020, entitled "PERSONAL PROTECTIVE ANTI-VIRAL FACE MASK," which is incorporated by reference herein in its entirety.

BACKGROUND

There are various types of masks and other personal protective devices worn over the respiratory pathways of a wearer to protect the wearer and those around him/her. Limiting exposure to viral and other contaminants by wearing a mask is an often-used device for limiting infection and spread of various airborne respiratory pathogens. For example, acute respiratory infection is a leading cause of death in the world. The spread of pathogens such as severe acute respiratory syndrome (SARS) and, in particular, the current SARS-CoV-2 (COVID-19) virus need to have measures taken to reduce the infection rate and transfer of virus from one person or animal to another. Rather than waiting until a vaccine, treatment, or a particular and effective anti-viral drug to be developed to treat a particular pathogen, wearing a facemask has become widely accepted as a non-pharmaceutical method to reduce the risk of respiratory infection or transmission of infection.

There are various examples of masks that have been used in the past. Typically, common cloth facemask may be a disposable surgical facemask, an N95 respirator, and/or a face shield. This type of facemask reduces transmission of airborne pathogens. They do so by preventing the wearer from directly touching his or her nose or mouth or by containing and/or limiting the discharging of aerosol drops or other viral particles or droplets containing viral particles from the wearer's mouth and nose when exhaling, coughing or sneezing. However, these types of masks are unable to adequately block airborne viruses, most of which are smaller than 0.3 microns and can pass through the pores in fabrics of these type of masks. In addition, these face masks are typically not a face-fitting mask where the mask seals around the edges of the mask against the wearer's skin. As a result, air and virus can leak through the periphery of the mask, which can significantly reduce the mask's effectiveness. These types of masks operate under the "entrapment" principal. Entrapment means having "openings" that permeate the mask where the "openings" are smaller than the particles the mask is designed to keep out. The problem with entrapment masks is that when they are used to keep out very small particles, like viruses, the openings are so small that human lungs cannot pull enough air through the mask to breathe.

Most conventional masks, including N95 masks, use entrapment technology. Their effectiveness against naked viruses (viruses not surrounded by droplets of water or phlegm) is minimal. Entrapment masks can be effective against contagions that are surrounded by micro droplets of water or phlegm. However, as soon as the droplet evaporates, which decreases the effective particle size that contains a virus, the virus is then free to pass through the mask and infect the person wearing the mask.

There are still other types of masks. In particular, there are masks that employ treatment systems thought to destroy virus. In particular, various masks may employ electrical systems that use ultraviolet light to attempt to irradiate virus and other pathogens. This is difficult and often impractical because there must be a power source and that power supply must be regularly checked and maintained in order to be effective. To ensure their effectiveness the systems must be regularly maintained and monitored. Compliance with this can compromise effectiveness of the device.

In addition to cloth facemasks and masks or other systems that employ UV light to control or attempt to irradiate virus, there are full face masks/gas masks or other respirators that are often used by the military that employ canisters to protect against chemical, biological, radiological and nuclear (CBRN) hazards. These systems also use entrapment-based technologies. Unlike cloth masks though, these masks typically use activated carbon to entrap the contagion or other particle. These masks are typically air tight against the wearer's face. The wearer breathes through a single canister or multiple canisters physically engaged with the mask, often on the sides of the mask. These canisters typically contain activated carbon, which absorb the contagion or other harmful component into the interstitial spaces of the activated carbon substrate itself. The material captured is not typically destroyed using these types of gas masks employing one activated carbon, but rather only capture into the interior of the activated carbon. Significantly, activated carbon is not a single material. The term usually refers to a family of carbon-based solid sorbents typically prepared by heat-treating coconut shell, wood, coal, and other carbonaceous substances. Owing to the microporosity and high surface areas of these components, these materials trap a broad range of organic compounds and other substances. In attempts to improve these systems, manufacturers have, in some instances, impregnated activated carbons with metal salts, amines, and other species to enhance the materials' ability to interact with and capture various types of chemical substances, especially highly volatile ones. While activated carbon is most typically used, U.S. military gas mask filters have used activated carbon impregnated with copper, silver, zinc, molybdenum, and triethylenediamine.

SUMMARY

An aspect of the present disclosure is generally directed to an entrainment-based filter that includes a housing defining an interior volume comprising at least one airflow pathway having an airflow pathway length spaced within the interior volume and a plurality of entrainment substrates that are substantially free or free of pores capable of filtering by entrapping particulates and positioned within the at least one airflow pathway. The plurality of substrates and the dimensions of the at least one airflow pathway work together to establish a residence time within the housing sufficient to entrain particulates on the surface of the plurality of substrates by absorption of the particulates and thereby prevent at least 95% of particulates traveling through the at least one airflow pathway from exiting the entrainment-based filter.

Another aspect of the present disclosure is generally directed to an entrainment-based filter having a housing defining an interior volume that includes at least one airflow pathway having an airflow pathway length that is longer than the length of the interior volume and spaced within the interior volume and a plurality of entrainment substrates that are at least partially coated with a coating composition and positioned within the at least one airflow pathway. The plurality of substrates and the dimensions of the at least one airflow pathway work together to slow the flowrate of particulates traveling within the at least one airflow pathway proximate the entrainment substrates to a flowrate where the particulates are absorbed on the surface thereof.

Yet another aspect of the present disclosure is generally directed toward a facemask that includes at least one entrainment-based filter. The entrainment-based filter may be either 1) an entrainment-based filter having a housing defining an interior volume comprising at least one airflow pathway spaced within the interior volume and a plurality of entrainment substrates that are substantially free or free of pores capable of filtering by entrapping particulates and positioned within the at least one airflow pathway where the plurality of substrates and the dimensions of the at least one airflow pathway work together to entrain particulates on the surface thereof by adsorption of the particulates and prevent at least 95% of particulates traveling through the at least one airflow pathway from exiting the entrainment-based filter or 2) an entrainment-based filter having a housing defining an interior volume comprising at least one airflow pathway having an airflow pathway length that is longer than the length of the interior volume and spaced within the interior volume and a plurality of entrainment substrates that are at least partially coated with a coating composition and positioned within the at least one airflow pathway where the plurality of substrates and the dimensions of the at least one airflow pathway work together to slow the flowrate of particulates traveling within the at least one airflow pathway proximate the entrainment substrates to a flowrate where the particulates are absorbed on the surface thereof.

Another aspect of the present disclosure is generally directed toward an entrainment-based filtering system for use in connection with a facemask or respirator having a filter housing defining an interior volume comprising at least one airflow pathway having an airflow pathway length that is longer than the length of the interior volume and spaced within the interior volume and a plurality of entrainment substrates that are: (1) substantially free of pores capable of filtering by entrapping particulates and/or (2) at least partially coated with a coating composition on the exterior surface of the plurality of entrainment substrates. The plurality of entrainment substrates may be positioned within the at least one airflow pathway and the plurality of substrates and the dimensions of the at least one airflow pathway work together to entrain particles on the surface thereof and prevent at least 95% of particles traveling through the at least one airflow pathway from exiting the entrainment-based filtering system.

Yet another aspect of the present disclosure is generally directed to an entrainment-based filter that includes a housing defining an interior volume with an air pathway and optionally a plurality of entrainment substrates. The pathway and, if present, the plurality of entrainment substrates, define a residence time of air in that pathway during use when air is moving through the air pathway and an airflow pressure drop of between 0.5 and 3 liters per minute occurs between the air inlet and the air outlet during use such that at least 95% of virus-size particles traveling through the entrainment-based filter along the air pathway are captured within the entrainment-based filter.

These and other aspects, objects, and features of the present disclosure and the claim invention will be understood and appreciated by those skilled in the art upon studying the following specification, claims, and appended drawings.

DETAILED DESCRIPTION

Figures 1, 2:
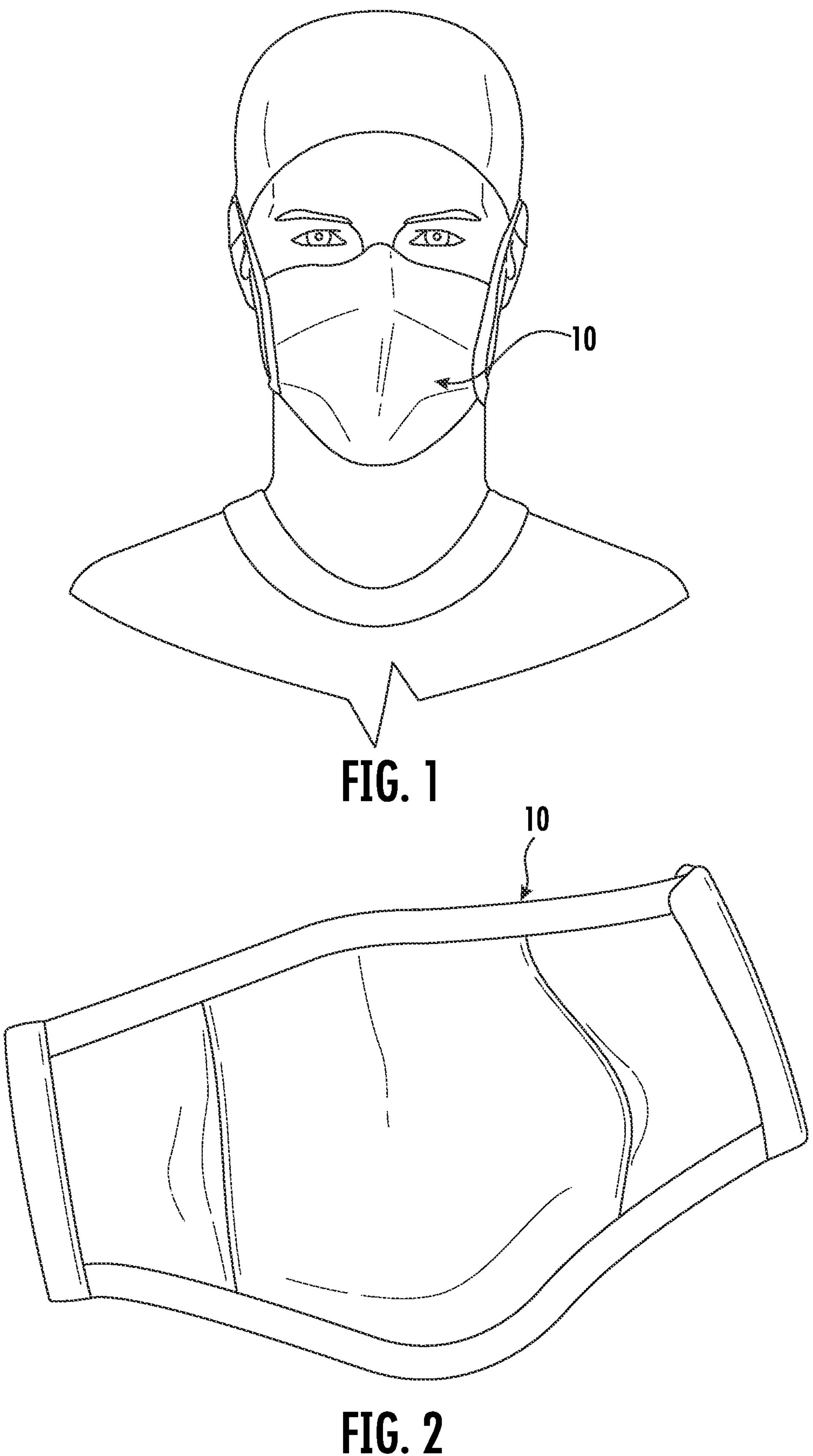
FIG. 1 is front view of a person wearing a cloth facemask
FIG. 2 is a rear view of a cloth facemask having a pocket or sleeve capable of receiving an entrainment-based filter cartridge according to an aspect of the present disclosure.

It is to be understood that the disclosure and the claimed invention may assume various alternative orientations, except where expressly specified to the contrary. It is also to be understood that the specific devices and processes illustrated in the attached drawings, and described in the following specification are simply exemplary embodiments of the inventive concepts defined in the appended sample claims. Hence, specific dimensions and other physical characteristics relating to the embodiments disclosed herein are not to be considered as limiting, unless the claims expressly state otherwise. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, 10) contained within the range. In this specification and the appended claims, the singular forms "a," "an" and "the" include plural reference unless the context clearly dictates otherwise. All combinations of method steps or process steps as used herein can be performed in any order, unless otherwise specified or clearly implied to the contrary by the context in which the referenced combination is made.

Various embodiments of the anti-viral entrainment-based face mask of the present disclosure may also be substantially free of any ingredient or feature described herein, provided that the remaining composition still contains all of the required ingredients or features as described herein. In this context, and unless otherwise specified, the term "substantially free" means that the selected composition contains less than a functional amount of the optional ingredient/element, typically less than 1%, including less than 0.5%, including less than 0.1%, and also including zero percent, by weight of such optional or selected essential ingredient/element.

To the extent that the terms "includes" or "including" or "have" or "having" are used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" or similar structure will be employed. Thus, use of the term "or" herein is the inclusive, and not the exclusive use. Also, to the extent that the terms "in" or "into" are used in the specification or the claims, it is intended to additionally mean "on" or "onto."

Unlike masks employing entrapment technologies, the present disclosure is generally directed to a facemask or other personal protective device that employs an entrainment-based cartridge to provide protection against pathogens and particles, in particular bacteria and/or viruses and provide unique benefits over prior systems. The personal protective devices of the present disclosure are generally directed to those that use an "entrainment-based" cartridge that is the functioning part of a face mask designed to entrain and trap all manner of contagions (virus, bacteria, mold, yeast) at high confidence (99+%) on both inhale and exhale without a large pressure drop, which would otherwise make breathing difficult. The cartridges and masks of the present disclosure typically do not disrupt breathing of a healthy human. The systems of the present disclosure could conceivably be used to protect any breathing mammal from pathogens, but would most typically be used in connection with a facemask or respirator for a human. The facemasks incorporating the filtering technology of the present disclosure such as an entrainment filtering cartridge may be Class I or Class II FDA certified facemasks that meet the liquid barrier performance consistent with ASTM F1862 standard and the flammability requirement of 16 CFR Part 1610.

Entrainment results from diffusion of airborne contagions across a boundary layer of air surrounding an entrainment medium. The entrainment medium typically used in the context of the devices of the present disclosure utilize a substrate material, which is typically inert that is coated or has a substance on all or a part of the exterior surface area of the substrate material where the coating composition can be one or a plurality of components. The substrates may be inert prills, such as beads, typically a polymer bead such as a polystyrene foam (STYROFOAM®) beads, fibers or particles. The substrate material may also be a woven or non-woven material. The substrate may be a nonwoven polymer mat or mats using polyethylene, polypropylene, and/or polyester or a cellulose pulp too. A mixture of different substrate materials may also be employed. The entrainment substrate medium is typically not a porous material such as an organic porous material like conventional activated carbon.

Figure 47:
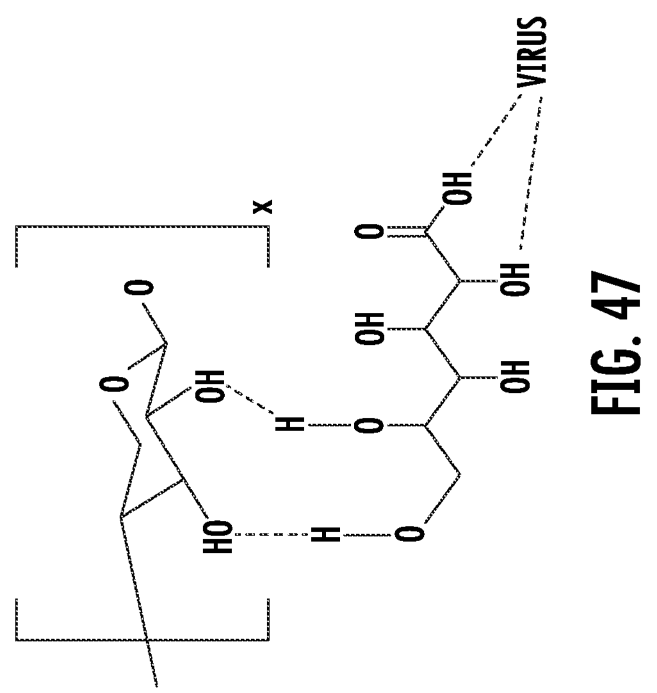
FIG. 47 is a depiction of the binding of a virus to gluconic acid or other bifunctional organic compound with cellulose particles illustrated as being hydrogen-bonded to the diol component of the gluconic acid.

The entrainment substrate material(s) to be coated in the context of the present disclosure, but are typically coated with a substance that is "sticky" to contagions. When coated, the coating substance(s) may be a non-volatile liquid and/or one or more substances that bind to both the substrate material and virus particles. The sticky coating can be a non-volatile liquid such as polyethylene glycol, a water-based gel, or a liquid surfactant. The non-volatile liquids typically have characteristics similar to thixotropic fluids. Thixotropes are liquids that highly viscous and not subject to flow under static conditions. However, when shear-stressed, their viscosity drops and they can flow. They have "time dependent" viscosity. Within the non-volatile liquid coating can be a variety of contagion neutralizing substances such as iodine, silver nitrate, and quaternary ammonium compounds. The sticky coating can also be a bifunctional organic compound which contains both hydroxylated carboxylic acid (or similar) at one end and a 1, 2-diol at the other end (See generally FIG. 47). A α-hydroxy carboxylic acid may be employed or another diol such as gluconic, sialic acids derivatives of neuraminic acid, or ascorbic acid or mixtures of more than one of these. When used, gluconic acid dissolved in water is allowed to dry and deposit on the entrainment substrate. These compounds, which are often diols that are known to bind to contagions, provide a bifunctional linkage between the entrainment substrate and contagion to be captured, such as a coronavirus or influenza virus, may be used to coat the entrainment substrates of the present disclosure. An additional benefit of using these hydroxylated carboxylic acids as the "sticky" medium is that they immobilize the virus until it is destroyed by exposure to the atmosphere. Restated, the bifunctional linkage provides unique advantages for capturing contagions such as viruses. With the diol part and the alpha-hydroxy carboxylic acid in the same molecule the virus is immobilized by linking the virus to the entrainment substrate.

In the case of a coronavirus such as COVID-19, the entrainment-based filtration technology of the present disclosure may be markedly enhanced through a modification of the particles that are used for the filtration process. The COVID-19 and other acute respiratory virus invades (human) host cells by first attaching itself to the cell through the protein spikes on its surface followed by membrane bilayer fusion, which is facilitated by a second protein. This opens the cell membrane merging the two cells into one and allows the virus's RNA to be used to replicate the virus using the cell's machinery. These initial attachments of the virus's protein spikes match up with various receptors, one group being acidic amino sugars known as sialic acid. Moreover, Vitamin C (ascorbic acid) has been shown to have anti-viral properties. Humans do not produce this water-soluble compound but rather, obtain it from food. Due to structural similarities between ascorbic or gluconic acid and sialic acids, it is presently believed that these types of spiked viruses may bind to gluconic or ascorbic acid (Vitamin C) and structurally related compounds as discussed herein. The process would be consistent with anti-viral properties. Like the cellulose found in plant fibers, these compounds contain polyol groups (multiple alcohol groups) which would permit these materials to stick together. This would make it a very simple process to dissolve the hydroxylated carboxylic acid in water, and then add the entrainment substrate of the present disclosure to the solution. This would coat the entrainment substrate, which can be made of organic or inorganic substance such as a polymer bead, cellulose or other materials as discussed herein. After drying, the entrainment substrate particles would be coated with solid coating such as ascorbic acid or other bifunctional compound or other non-volatile coating as discussed herein. These modified particles would then be used in the cartridges of the present disclosure. In the case of at least Vitamin C, it is noteworthy that normal breathing would dampen the solid particles on the surface potentially at least partially solubilizing the acid and thereby facilitating the interaction of the hydroxylated acid and the virus. This binding would further limit the virus's mobility and thus, its likelihood of reaching the wearer's lung tissue or alternatively, from the wearer's lungs into the air.

Of the diols specifically mentioned above, gluconic acid represents an attractive choice as the liner because it combines several of the features of sialic acids and is readily available. The gluconic acid chemically bonds to the diol parts of a particle leaving the alpha-hydroxy acid end to provide a fake receptor site for the virus to bind with when encountering it.

Figure 48:
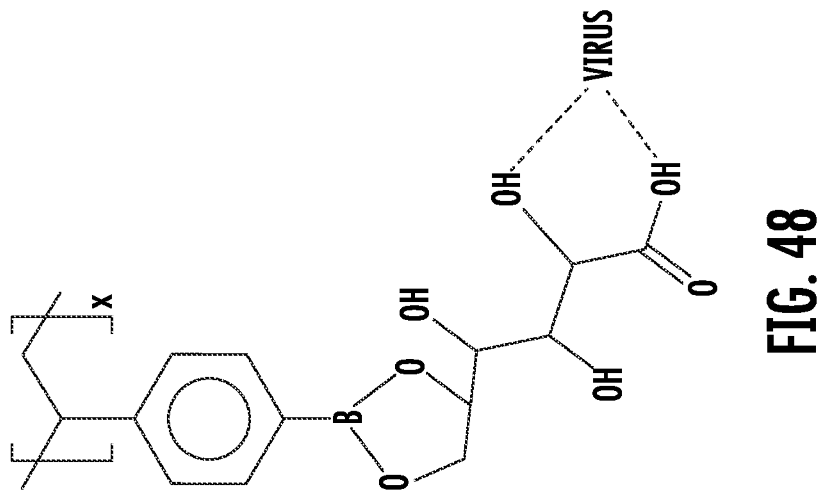
FIG. 48 is a depiction of the binding of a virus to gluconic acid or other bifunctional organic compound with a born containing polymeric particles illustrated as being hydrogen-bonded to the diol component of the gluconic acid with boron-containing polymeric particles shown covalently bonded to gluconic acid.

It may also be possible to use an amphiphilic organoboron block copolymer poly(styreneboronic acid)-block-polystyrene (PSBA-b-PS), which may be prepared through a post polymerization modification route from the silicon-functionalized block copolymer poly(4-trimethylsilylstyrene)-block-polystyrene (PSSi-b-PS). PSBA-b-PS is obtained through highly selective reaction of PSSi-b-PS with BBr3 at room temperature and subsequent hydrolysis of the BBr2-functionalized intermediate. This amphiphilic organoboron block copolymer poly(styreneboronic acid)-block-polystyrene (PSBA-b-PS) may chemically bond to a diol component of gluconic acid and the others mentioned above as well as related compounds thereby providing a fake receptor site for virus (See generally FIG. 48).

Additionally, the entrainment-based cartridge systems of the present disclosure further do not typically contain physical or chemical components that utilize entrapment technology. In particular, the entrainment substrates of the present disclosure are typically not a substrate with pores such as are found in activated carbon. Instead, while the entrainment substrates may be differently or even irregularly shaped, they do not typically have interstitial spaces within it that would provide absorption into the entrainment substrate of any substantial amount of coating material(s). While uses of entrapment-based technology may also be used in connection with the entrainment-based cartridges to supplement the use of the devices and cartridges of the present disclosure, this is not necessarily the case.

In order to trap viral particles in an entrainment-based cartridge according to an aspect of the present disclosure the housing of the cartridge is packed with small particles that may be coated with a wet or solid material as discussed in greater detail herein. The characteristic pore size in the packed bed does not have to be small or even exist. The efficacy of the viral absorption of the cartridge/masks of the present disclosure will depend upon whether the viral particles carried by air through the cartridge and the bed of substrates have sufficient time to absorb before reaching the outlet of the cartridge on the face side of the mask.

Figure 5:
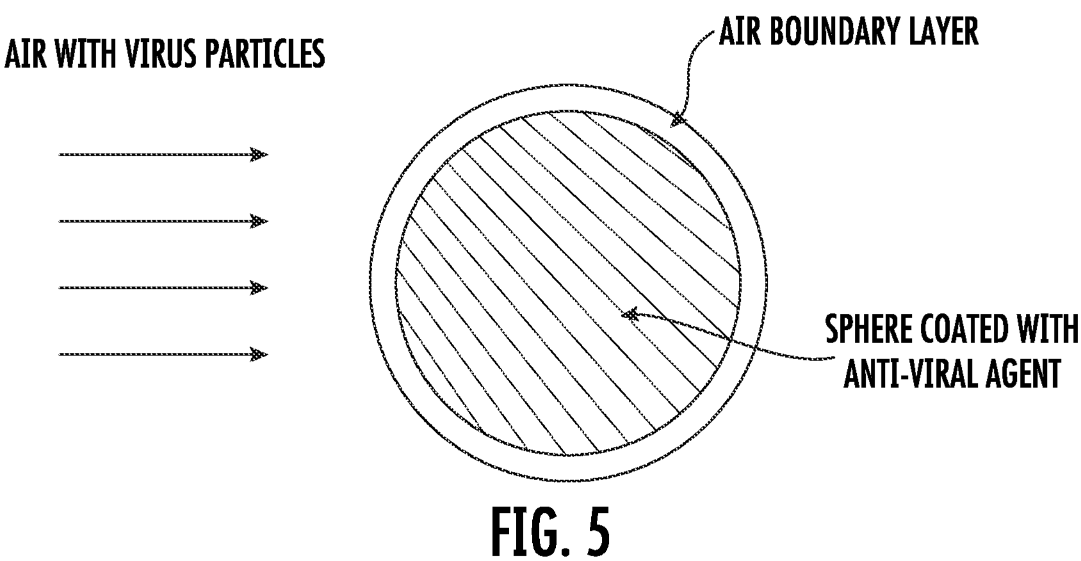
FIG. 5 is a schematic depiction of entrainment utilized to adsorb the virus or other contagion or pathogen on the surface of the entrainment substrate or the coating on the surface of the entrainment substrate of the present disclosure.
Figure 6:
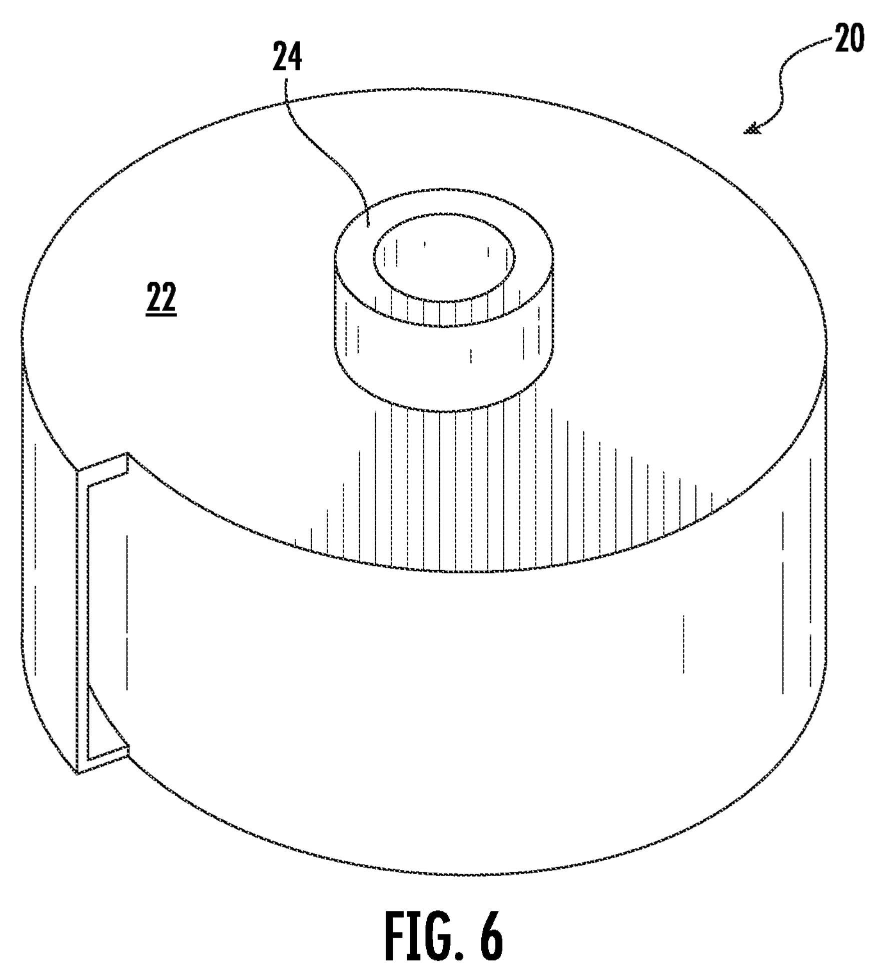
FIG. 6 is a perspective view of an exemplary solid cartridge according to an aspect of the present disclosure.

Viral particles are exceedingly small. Most viruses vary in diameter from about 20 nanometers to 250-400 nm. However, some virus measure about 500 nm in diameter and are about 100-1,000 nm in length. The SARS-CoV-2 (COVID-19) is a relatively large sized virus having a diameter of approximately 120 nm. The COVID-19 virus has a lipid envelope as well as an internal protein capsid. The masks of the present disclosure that utilize gluconic acid as the coating on the substrate or other bifunctional coatings appear to be particularly well-suited for binding to the protein spikes of coronaviruses. In practice, the small size of the viral particles means the virus have very little inertia and therefore the virus can be expected to follow the carrier gas streamlines. The viral particles will follow every twist and turn of an airflow as it passes through the packed bed of substrates, which are typically spherically shaped prills. As shown in FIG. 5, very near the surface of any solid sphere the gas flow will form a boundary layer characterized by steep velocity gradients and flow that is primarily tangent to the sphere surface. As a result, viral particles carried by air must cross this boundary layer via diffusion rather than convection. Once the virus particles diffuse across this boundary layer of non-moving air, they will be absorbed into the entrainment substrate either by sticking to an active site of a compound (like ascorbic acid), or the nonvolatile thixotropic liquid, or blend of any combination of such components/compounds discussed herein for absorption.

The rate that a dilute solute (such as viral particles in air) crosses the boundary layer discussed above (See FIG. 5) is characterized by the product of the mass transfer coefficient and the concentration driving force:

$$N_v = k'(C_{vo} - C_{vs}) \tag{1}$$

In the above expression, $N_v$ is the molar flux of virus particles to the sphere surface, k' is the mass transfer coefficient, $C_{vo}$ is the molar concentration of virus particles in the air, and $C_{vs}$ is the molar concentration of virus particles on the sphere surface. The efficacy of the packed bed of entrainment substrates used in a mask or the cartridge of the mask of the present disclosure will depend strongly on the magnitude of the mass transfer coefficient, k', which in turn depends upon the Reynolds and Schmidt numbers, which are defined below. For flow in a packed bed that includes a plurality of spherical particles, the mass transfer coefficient can be found from the following empirical correlation:

$$k' = u_0 Sc^{-2/3}[2.19\ Re^{-2/3} + 0.78\ Re^{-0.381}] \tag{2}$$

In the above expression $u_o$ is the superficial velocity, which is calculated from the volumetric flow rate (Q) and the cross-sectional area of the bed (ignoring the fact that some of it is blocked by the spherical particles):

$$u_0 = \frac{Q}{\pi R^2} \tag{3}$$

where R is the radius of the bed (cannister radius in the typical instance when the cartridge has a cylindrical shape). The Reynolds and Schmidt numbers are defined as:

$$Re = \frac{u_0 D_p}{v(1 - \varepsilon)} \tag{4}$$

$$Sc = \frac{v}{D_v} \tag{5}$$

Here, v is the kinematic viscosity, ε is the bed void fraction, $D_p$ is the spherical packing particle diameter, and $D_v$ is the diffusivity of the virus particles in air.

The time required for a virus particle to diffuse across a boundary layer at the surface of a packed bed sphere should be much smaller than the time required for the virus particle to pass through the bed in the absence of any adsorption on the spheres. This will work to ensure improved efficacy of the cartridge. The mass transfer coefficient described above can be used to estimate the former timescale. The mean residence time of air in the packed bed can be used to estimate the latter quantity. Specifically, the timescale for diffusion across the boundary layer can be estimated as:

$$T_d = \frac{\delta}{k'} \tag{6}$$

where δ is the thickness of the boundary layer. The characteristic residence time of an air molecule in the bed (and therefore a virus particle that is not absorbed) can be found from the mean axial air velocity and the length of the bed:

$$T_r = \frac{\pi R^2 L_\varepsilon}{Q} \tag{7}$$

where L is the bed length. Hence, it is presently believed that the effectiveness of the mask will be given by the ratio of these two time scales; specifically, it is best to maximize the following quantity:

$$\frac{T_r}{T_d} = \frac{k' \pi R^2 L_\varepsilon}{\delta Q} \tag{8}$$

Although Eq. (8) immediately above is useful for designing the mask design (packing sphere diameter, and radius and thickness (length) of the packed bed), it does not provide information concerning the efficacy of the mask. Such a quantitative prediction of mask performance, however, can be obtained by applying principles of chemical reactor design. The mole balance for a packed-bed reactor is given by:

$$r_v = (dFv)/dV \tag{9}$$

where $r_v$ is the rate of generation of species v (moles/bed volume/time), $F_v$ is the molar flow rate of species v, and V is the bed volume. Assuming that virus particles are captured/neutralized instantly upon arrival on the sticky liquid or solid that coats the packing substrates (typically spherical substrates), the rate of virus capture will be limited by diffusion across the air boundary layer discussed previously. In that case, the rate of disappearance of virus can be found by making use of Eq. (2) and geometric analysis, yielding:

$$r_v = -\frac{6k'(1-\varepsilon)C_v}{D_p} [=] \frac{moles}{(\text{bed volume}) \cdot (\text{time})} \tag{10}$$

In the Eq. (9), $C_v$ is the concentration of virus particles in the air; the negative sign appears because virus particles are being deleted from, not added to, the air. The fractional conversion of virus particles (fraction of viruses adsorbed onto spheres) is related to $F_v$ and $C_v$ as follows:

$$F_v = C_{vo} Q(1-X)$$

$$C_v = C_{vo}(1-X) \tag{11}$$

Substitution of Eqs. (10) and (11) into (9) leads to:

$$\frac{dX}{1-X} = -\frac{6k'(1-\varepsilon)}{QD_p} dV \tag{12}$$

Integrating Eq. (12) and expressing the bed volume in terms of the bed length and radius, the following is obtained:

$$X = 1 - \exp\left[-\frac{6\pi k' L R^2 (1-\varepsilon)}{QD_p}\right] \tag{13}$$

The pressure drop across the packed bed can be computed using the Ergun equation, which can be expressed as:

$$\Delta P = \frac{\rho L u_o (1-\varepsilon)}{D_p \varepsilon^3}\left[\frac{150\mu(1-\varepsilon)}{D_p} + 1.75 u_o\right] \tag{14}$$

In the act of breathing, humans can generate a pressure drop of 1-2 psi.

Tables 1-3 shows the physical properties and other data needed to determine the ratio of timescales and pressure drop discussed above. All physical property data are at 20° C. It is presently believed that the average air intake rate of humans is 60 L/min. The following are free parameters for design: the radius of the cartridge, R, the diameter of the spherical packing particles, Dp, and the length of the packed bed, L. These should be chosen to maximize the ratio of $\tau_R/\tau_d$ and the fraction of virus particles adsorbed, X, while minimizing the pressure drop.

In the above, two parameters have been estimated. First, due to their small size, the diffusivity of virus particles in air was assumed similar to that of common solute molecules in air. Such an estimate may be too large since the mass of a virus particle exceeds that of a gas molecule, so the Schmidt number may be under-predicted. As such, the characteristic diffusion time could be underestimated. Second, the thickness of the boundary layer was assumed to be δ=Dp/10. There likely exist correlations that could be used to get a better estimate of this quantity, which also figures prominently in the estimate for $\tau_d$.

TABLE 1

Design parameters that can be changed

| Quantity | Value | Common Unit | SI Value | SI Units | Comment |
|---|---|---|---|---|---|
| Dp | 1.00E+01 | mm | 1.00E−02 | m | |
| R | 3.00E+00 | inches | 7.62E−02 | m | |
| L | 2.00E+00 | inches | 5.08E−02 | m | |

TABLE 2

Physical Constants and Constant Parameters

| Quantity | Value | Common Unit | SI Value | SI Unit | Comment |
|---|---|---|---|---|---|
| rho_air (Pair) | | | 1.2041 | kg/m^3 | Air density, 20 C. |
| nu_air | 1.52E−05 | m^2/s | 1.52E−05 | m^2/s | kinematic viscosity of air, 20 C. |
| D_A | 2.00E−05 | m^2/s | 2.00E−05 | m^2/s | Assumed diffusivity of virus in air, 20 C. |

TABLE 2-continued

| Physical Constants and Constant Parameters | | | | | |
|---|---|---|---|---|---|
| Quantity | Value | Common Unit | SI Value | SI Unit | Comment |
| Sc | 7.58E−01 | none | 7.58E−01 | none | Schmidt number for air, nu/D_A |
| Epsilon (E) | 4.00E−01 | | 4.00E−01 | none | Assumed bed porosity, common for random packed spheres |
| Q | 6.00E+00 | L/min | 1.00E−04 | m^3/s | Volumetric flow rate through bed |

TABLE 3

| Calculated Quantities | | | |
|---|---|---|---|
| Quantity | Value | Units | Comments |
| u_o | 5.48E−03 | m/s | Superficial velocity through bed |
| Re | 9.04E+00 | none | Reynolds number |
| k | 5.55E−03 | m/s | Mass transfer coefficient across air/sphere boundary layer |
| v_char | 1.37E−02 | m/s | Characteristic velocity through bed |
| delta | 1.00E−03 | m | Assumed boundary layer thickness |
| tau_d | 1.80E−01 | S | Diffusion time scale across bound-ary layer |
| tau_r | 3.71E+00 | S | residence time in reactor |
| tau_r/tau_d | 2.06E+01 | none | Need this to be as large as possible, preferably >10 |
| Delta P | 6.66E−06 | psi | Pressure drop across mask, Ergun Equation. Note: most people capable of 1-2 psi. |
| % Viruses Adsorbed | 99.9999991 | % | This calculation does not rely on knowing boundary layer thickness |

Entrainment Cartridge

While the term “cartridge” is used herein, it should be broadly construed to be any shaped construction of hard or soft-sided material(s) that can be rigid or flexible. A cartridge may have a hard constructed exterior or have soft walls that are flexible. The cartridge is typically a container for the entrainment substrates and constructed to have a tortured air pathway as discussed herein.

Figure 3:
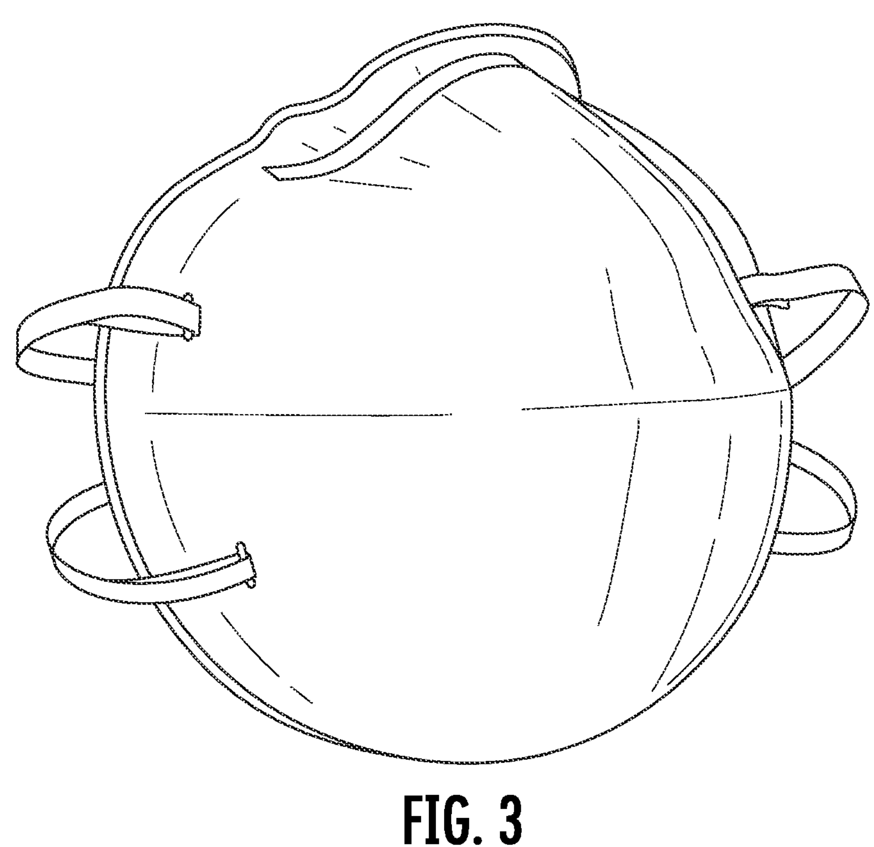
FIG. 3 is a front view of a surgical N95 mask, which may be modified to incorporate the entrainment-based filter technology of the present disclosure.
Figure 4:
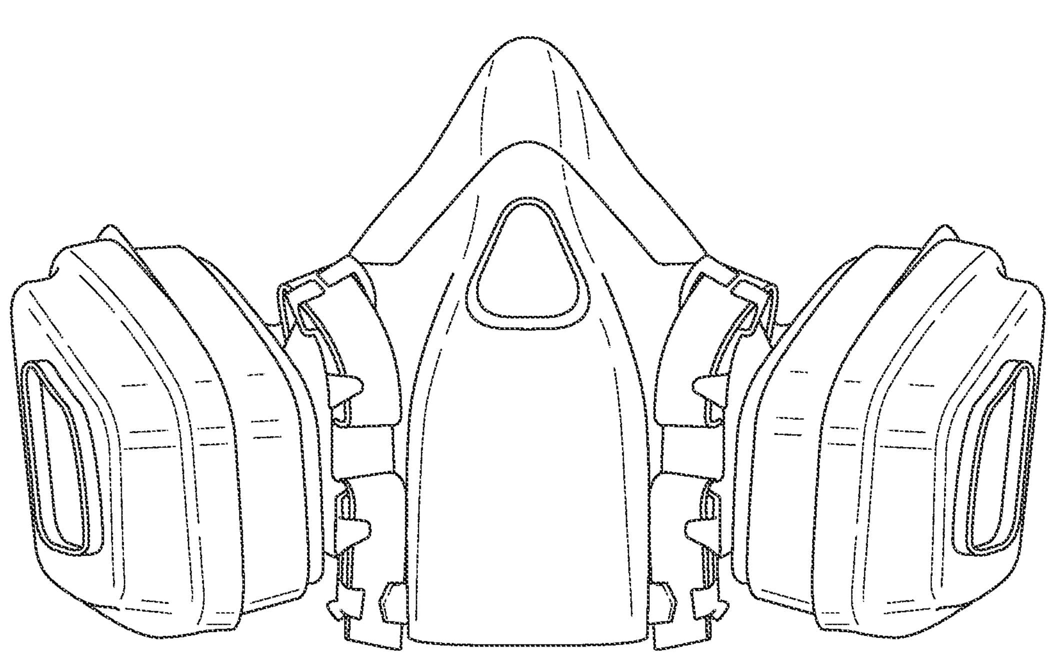
FIG. 4 is a face-sealing respirator that covers both the nose and the mouth of the wearer and utilizing one or two cartridges engaged to the mask.

The entrainment filter, which is typically in the form of a cartridge, of the present disclosure is adaptable to be used in connection with a variety of facemasks (FIGS. 1-2), particulate or surgical respirators that may be Class II FDA certified masks and better seal against the face of the wearer than cloth facemasks (FIG. 3) and/or gas masks (FIG. 4) that may be either for pathogen protection or military style masks that cover the entire face and not just the respiratory pathways as shown in the mask of FIG. 3. The respirators and masks of the present disclosure incorporating the entrainment-based filtration technology of the present disclosure may be NIOSH filtration efficiency compliant respirators/masks. Significantly, conventional filters based on having a pore size that is smaller than the particle to be filtered have an excessively large pressure drop as compared to the technology of the present disclosure. As such, conventional filters, in order to retain viruses, would have to be tightly sealed to the wearer’s face to force air to go through the filter of the mask rather than around the mask, which would bypass the filter. The filter would need to be essentially air tight and likely very uncomfortable to wear. The masks and antiviral systems of the present disclosure have a small pressure drop, which means the mask does not have to be so tightly fitted to the face, which will make it much more comfortable and less tiring to wear for extended periods of time.

FIG. 1 shows a standard surgical mask, which typically has a plurality of layers of woven or non-woven material and one or more elastic bands that hold the mask in position on the face of the wearer. The entrainment cartridges of the present disclosure will have a defined pathway for air to travel. The pathway to travel is typically a tortured air pathway that is constructed according to at least the parameters discussed above and designed to enable sufficient entrainment of all or virtually all (at least about 99.0%, which is significantly better than current N95 masks, but even as high as about 99.99%) of all virus to be adsorbed on the surface of the coating on the substrates of the cartridge. The shape of the packed bed typically will be designed based on various design parameters discussed above. If the air pathway is not designed to allow for sufficient time for viral particles to be absorbed on the surface of the coating, the device will be ineffective. Similarly, if the air pathway is too restricted such that the pressure drop is too high, the wearer of a mask incorporating the technology will not be able to breathe comfortably. In either case, this will lead to devices that are impractical. Additionally, if the packing particles are too small, then the required pressure drop to drive airflow through the bed will be larger than a person can produce by inhalation. However, it is presently believed that there is a fair amount of flexibility in terms of the combinations of bed diameter, packing diameter, and length that lead to high capture efficiencies. Additionally, it is presently believed that sharp turns in the air pathway or pathways of the cartridge will result in greater loss of momentum (and therefore increase the require pressure drop) compared to gentler turns, such as in a 3-D coil design (discussed below). Since the overall bed volume will determine how much of the virus is captured before it passes through the bed, it is presently believed that it is preferred to use larger bed diameters so that the bed length is shorter and therefore the cartridge has fewer twists and turns. Lastly, it is presently believed and the discussion about design of the devices of the present disclosure discussed herein is premised on the fact that the virus capture done in the context of the devices of the present disclosure is irreversible, i.e. there is no escape of a virus once it is entrained into the packing particles.

FIGS. 6-22 show generally an exemplary cartridge 20 of the present disclosure for capturing a virus when air, whether being breathed in or out, travels through the cartridge or the mask device such that the air pathway through the device includes a pathway through an entrainment cartridge according to an aspect of the present disclosure. The devices shown in FIGS. 6-22 are typically cylindrical to create the smallest cartridge as possible. The cartridge is typically from about two to about four inches in diameter, but more typically about three inches in diameter. The cartridge typically has a rigid housing with a top panel/cover 22 that encloses the interior volume of the cartridge. The cartridge has an air outlet distal from the face of the wearer and an inlet on the side of the cartridge proximate the face of the wearer. The cartridge is typically from about one to about two inches long, more typically about one inch long. However, if the acceptable effective capture of viruses is reduced to only 99.0%, the cartridge can be as little as three-eighths inch long. According to this aspect of the present disclosure, the cartridge typically has a mesh plate on each side of the cartridge that supports a nonwoven spunbond (polyester, polypropylene or polyethylene nonwoven) panel that fits over the mesh plate. This panel prevents the spunbond from collapsing in the interior of the cylinder during inhalation. A second mesh plate fits over the nonwoven spunbond panel to hold the spunbond in place during exhalation. The spunbond is typically from about 10 to about 35 gsm, more typically about 30 gsm of a thermoplastic polymer such as polypropylene. The mesh plates and spunbond are attached to the cylinder with plastic welding so the composite cannot be disassembled by a user without destroying the cartridge/cylinder. On one end of the cylindrical cartridge is a threaded mount 24, which will typically be a screw mounting or bayonet mounting system to attach the cartridge to the mask. The mounting allows the cartridge to engage the mask by hand and without the use of tools while sealingly engaging the mask and cartridge together when the cartridge is in the engaged position.

Figure 7:
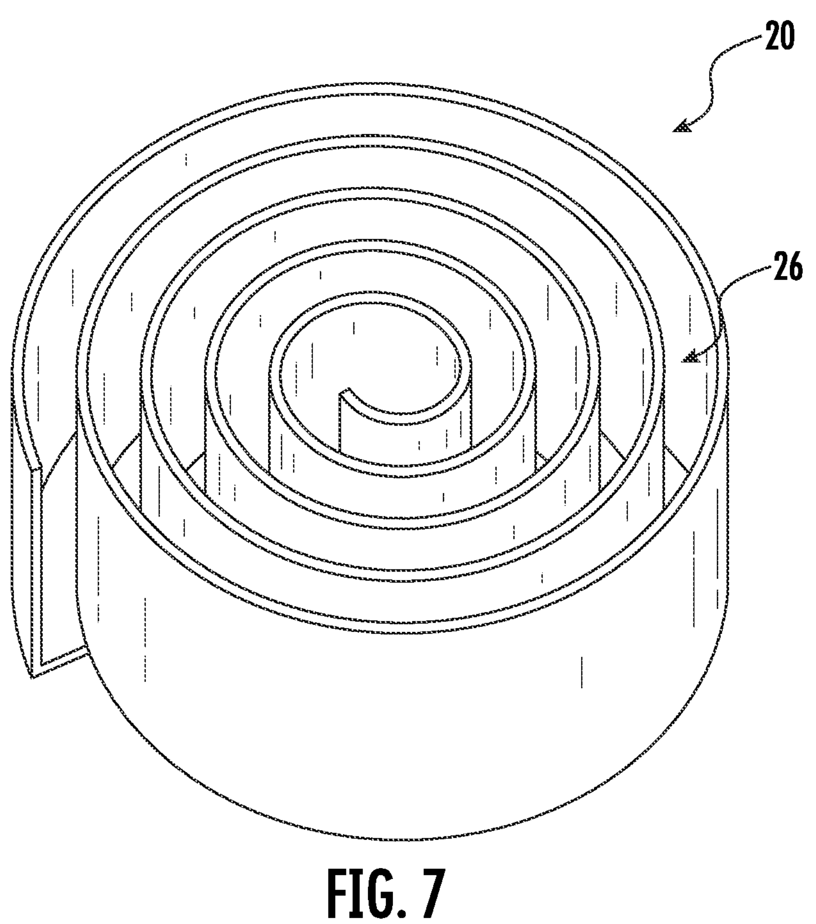
FIG. 7 is a perspective view of the cartridge shown in FIG. 6 where the interior has an exemplary air pathway.

Inside a typical cylindrically shaped cartridge is an empty space to be tightly packed with about 2 mm expanded boron-modified polystyrene beads (STYROFOAM® beads) or hydroxylated materials. The design of the cartridge is typically such that none of the beads can escape the cartridge because they will be likely contaminated with viruses or other pathogens. While the cartridge is typically about 1.5 inches long, the dimensions may be changed to accommodate the appropriate air pathway length as discussed herein. The channel inside the cartridge is designed such that air is pushed into the air pathway within the interior volume of the cartridge. By way of example, the air pathway within the interior volume of the cartridge may be a spiral wound tubing of about 0.75 inch diameter. In this configuration, the wearer will essentially be breathing through an enlarged straw. The entrainment substrates, whether coated or uncoated, may then be positioned within the spirally aligned tubing. An alternative interior air pathway is shown in FIG. 7, which shows a concentrically aligned spiral channeling system that would operate as the air pathway.

Typically, the cartridges of the present disclosure are cylinder-shaped ventilation compartments that are attached to the front of a respirator or gas mask. However, the cartridges could be constructed to be inserted into a pocket of a cloth facemask (see FIG. 2) and some benefits of the present cartridges provided. However, it is typically preferred that all or virtually all (at least about 99%) of the air a wearer will breathe in and breathe out will pass through the cartridge such that any virus in the air is entirely removed or at least about 99% of the virus in the air passing through the cartridge is removed. The cartridges of the present disclosure are typically attachable and detachable to a mask to be worn by hand and without the use of tools. In this manner, a user can easily remove and dispose of used cartridges and attach one or more replacement cartridges. While one cartridge can be used, if a plurality such as two are used the size of the cartridges employed may be smaller. The overall size of a typically used cartridge is such that the diameter of the cartridge is from about 0.5 inch to about 6 inches, more typically about 3 inches and the length of the cartridge is typically from about ½ inch to about 6 inches, more typically about 3 inches in length. When a single cartridge is used, the dimensions are typically about 3 inches in diameter and 1.5 inch in length and one cartridge is attached to each of the mouth and nose area of a respirator or gas mask that seals against the wearer to prevent air from entering or exiting the wearer without going through the mask.

Figures 8A, 8B, 8C:
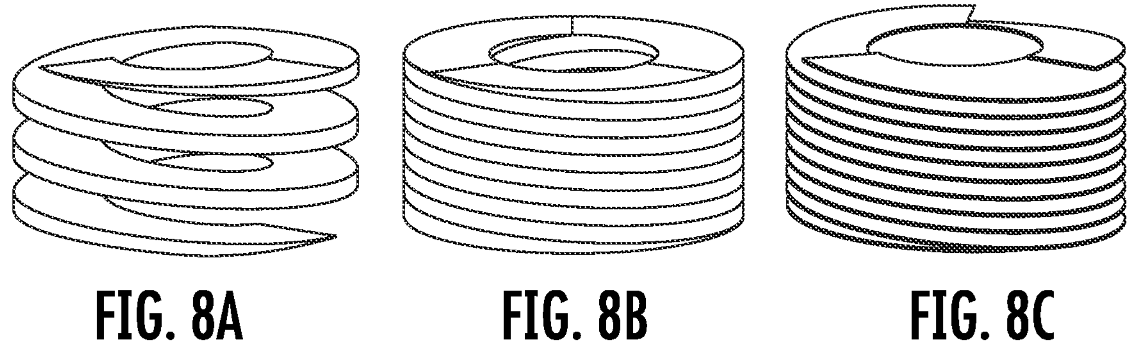
FIG. 8A is a coiled single tunnel/tubing design for an air pathway that may be used within an interior of a cartridge according to an aspect of the present disclosure.
FIG. 8B is a combination of three coiled tunnels/tubing for an air pathway that may be used within an interior of a cartridge according to an aspect of the present disclosure.
FIG. 8C is a depiction of hollow tunnels used in the interior of a cartridge according to an aspect of the present disclosure to establish an air pathway according to an aspect of the present disclosure.

The cartridges of the present disclosure typically consist of three components, small foam beads, which act as the entrainment substrates, spiral tunnels, and nonwoven spunbond panels. The small foam beads are typically coated with a non-volatile liquid or bifunctional chemical compound or compounds or conceivably a mixture thereof. As shown in FIGS. 8A-8C, the spiral tunnels may be made of plastic and can be formed into a cylinder or tube-shaped pathway representing the overall look and size of the cartridge itself. Airflow at either end of the cartridge has to slip through the nonwoven spunbond panels, which function to filter via entrapment dust or other larger particles. The pathway may be a single tunnel (FIG. 8A), three different tunnels combined (FIG. 8B) or hollow tunnels (FIG. 8C). The specific designs of the spiral tunnels affect two variables; the travel distance of air and surface area that air enters and exits through the cartridge. Controlling these two variables control and regulate the breathability, speech clarity and safety/viral removal efficacy factors.

Figures 9A, 9B, 9C:
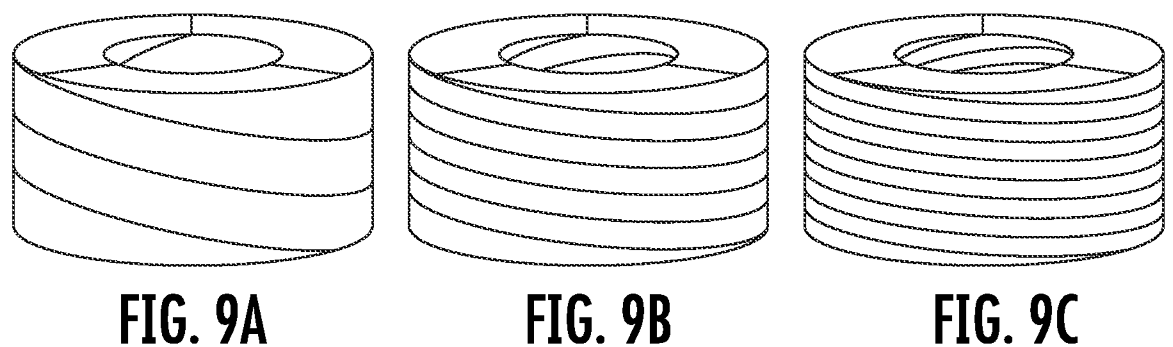
FIG. 9A shows an airflow pathway that makes one revolution in the interior of a cartridge of the present disclosure.
FIG. 9B shows an airflow pathway that makes two revolutions within the interior of a cartridge of the present disclosure.
FIG. 9C shows an airflow pathway that makes three revolutions within the interior of a cartridge of the present disclosure.

To change the residence time, the spiral design has to increase or decrease in either or both of cross-sectional area or length, i.e. the amount of time air is spent in a complete rotation around the tunnel is changed (See FIGS. 9A-9C). Increasing the rotation frequency would increase the air travel distance and make it harder to breathe through the cartridge/mask it is sealingly engaged with during use. FIG. 9A shows one revolution, FIG. 9B two revolutions, and FIG. 9C three revolution pathway designs. However, while the change makes it more difficult to breathe through the cartridge, the change increases the efficacy of the cartridge to capture more viruses in the air due to the longer airflow pathway.

Figures 10A, 10B, 10C:
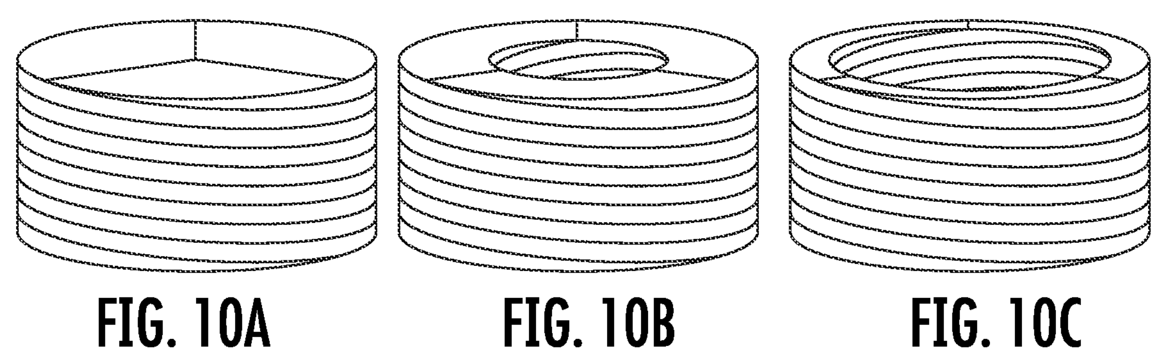
FIG. 10A shows an airflow pathway that extends to the center of the cartridge and has large cross-sectional surface area for the pathway.
FIG. 10B shows an airflow pathway that extends to point approximately one-half the radius of a cartridge and has an average cross-sectional surface area for the pathway according to an aspect of the present disclosure.
FIG. 10C shows an airflow pathway that extends only a short distance toward the center of the cartridge and has the smallest cross-sectional area of the three versions shown in FIGS. 10A-10C.

As shown in FIGS. 9A-9C, from the outside diameter to the center of the cylinder, the spiral section cut can extend to the center or stopped at a determined inner diameter. This changes the surface area of which the air enters and exits through the cartridge as shown in FIGS. 10A-10C. The increased surface area means the section cut has extended more toward the center. In the case of FIG. 10A, this is 7.069 sq. in. In the case of FIG. 10B, this is 5.302 sq. in. In the case of FIG. 10C, this is 3.093 sq. in. This increase in surface area increases the airflow to make the device more breathable and easier to speak through. However, it would be less efficacious in removing virus and other pathogens due to the shorter travel distance near the center of the cylinder.

Figures 11, 12, 13:
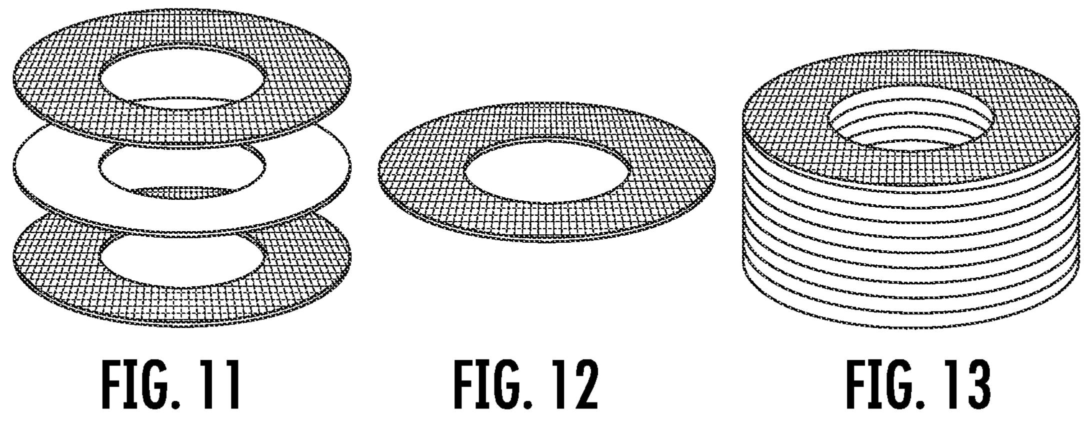
FIG. 11 is an exploded view of the nonwoven material and spunbond material that forms a panel on the ends of the cartridges according to an aspect of the present disclosure.
FIG. 12 is a perspective view of the panel of nonwoven and spunbond assembled.
FIG. 13 is a perspective view showing the panel of FIG. 12 on the top of the interior portion of a cartridge according to an aspect of the present disclosure.

As shown in FIGS. 11-13, at both ends of the cartridge are nonwoven spunbond panels in which the nonwoven spunbond (30 gsm polypropylene) on either side is bounded by two plastic meshes that are permanently welded to the spiral tunnels so that the mesh cannot be removed without breaking apart the cartridge (See FIG. 13).

Figure 14:
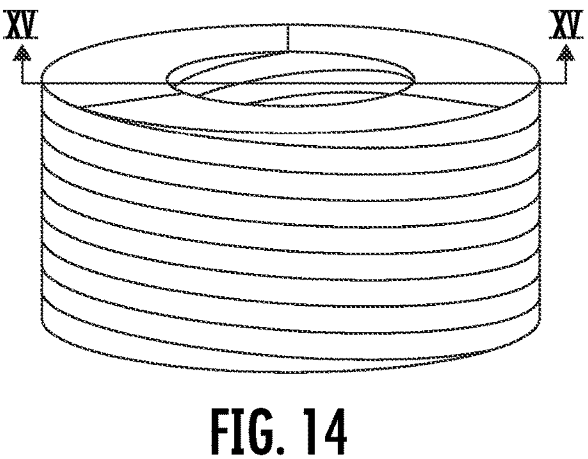
FIG. 14 is perspective view of a coiled air pathway interior of a cartridge according to an aspect of the present disclosure having a solid end.
Figure 15:
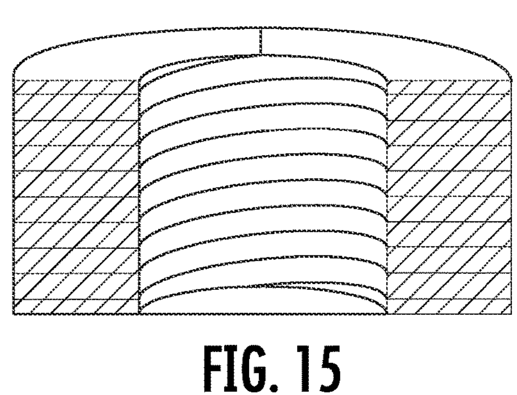
FIG. 15 is a cross-sectional view taken along XV-XV in FIG. 14.

As shown in FIGS. 14 and 15, either ends of the cartridge may be a solid end (bottom end in FIG. 14 and FIG. 15) or a hollow end (top shown in FIGS. 14 and 15). At the solid end, there is a solid plate that has the same thickness or at least substantially the same thickness as the housing/shell of the cartridge and is welded or otherwise affixed such that the ends are unable to be disengaged without damaging the cartridge such that this is a tamper-evident seal.

Figure 16:
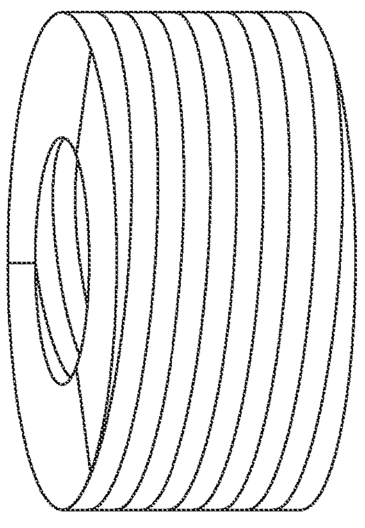
FIG. 16 is a perspective view of the interior portion of a cartridge according to an aspect of the present disclosure having a threaded solid end.
Figure 16:
Figure 17:
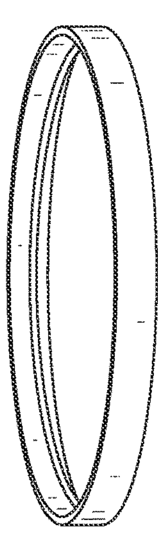
FIG. 17 is a perspective view of a threaded ring of a mask having a rubber or other elastomeric sealing gasket therein that matingly engages the threaded end of a cartridge according to an aspect of the present disclosure.

As shown in FIGS. 16 and 17, there are typically outside threads from the solid end designed to be screwed onto the mask. When screwed tightly into position by hand and typically without the use of tools, the solid end of the cartridge will meet with a rubber ring stopper that is part of the mask to make a full seal so that air cannot travel through the mask without being ventilated by the interior of the cartridge.

Figure 18:
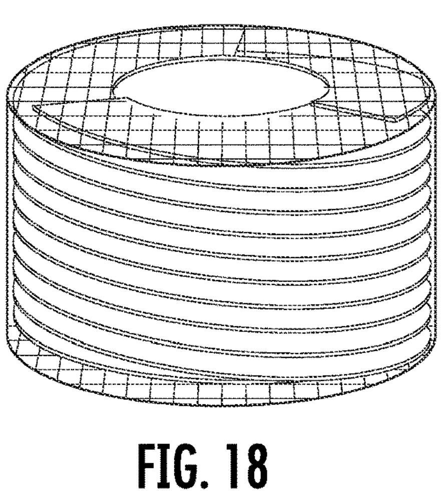
FIG. 18 is a translucent view of a cartridge according to an aspect of the present disclosure showing the interior construction of the airflow pathway.
Figure 19:
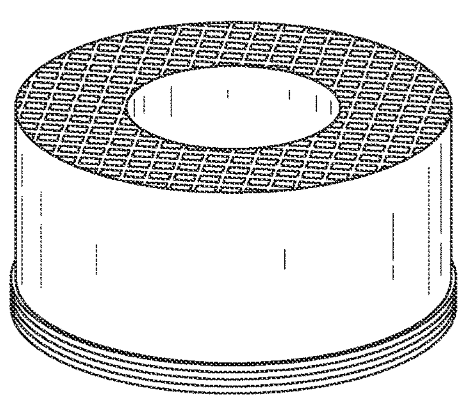
FIG. 19 is a non-translucent view of the cartridge of FIG. 18 showing the treaded solid end of the cartridge according to an aspect of the present disclosure.
Figure 20:
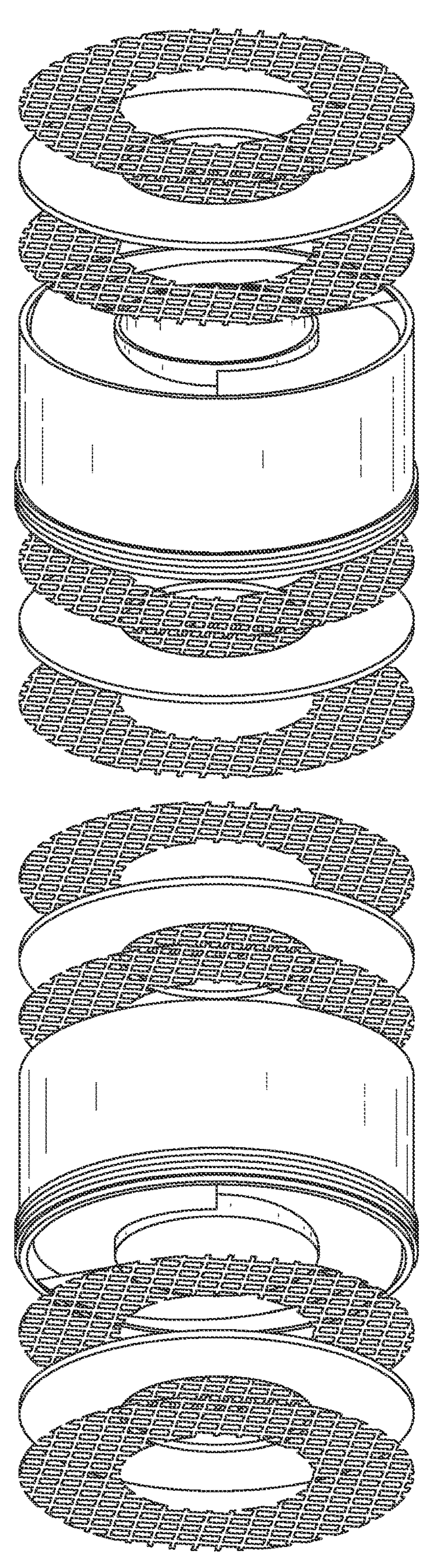
FIG. 20 is an exploded view of the cartridge according to an aspect of the present disclosure shown in FIG. 19.

FIGS. 18 and 19 show the final design of a cartridge of about three inch diameter and 1.5 inch length with a spiral frequency of three revolutions and a breathing surface area of about 5.302 square inches. A translucent view of the cartridge is shown in FIG. 18 and a solid view shown in FIG. 19 showing the threaded solid end that engages the airtight threaded seal of a mask. An exploded view of the overall cartridge is shown in FIG. 20.

Figures 21, 22:
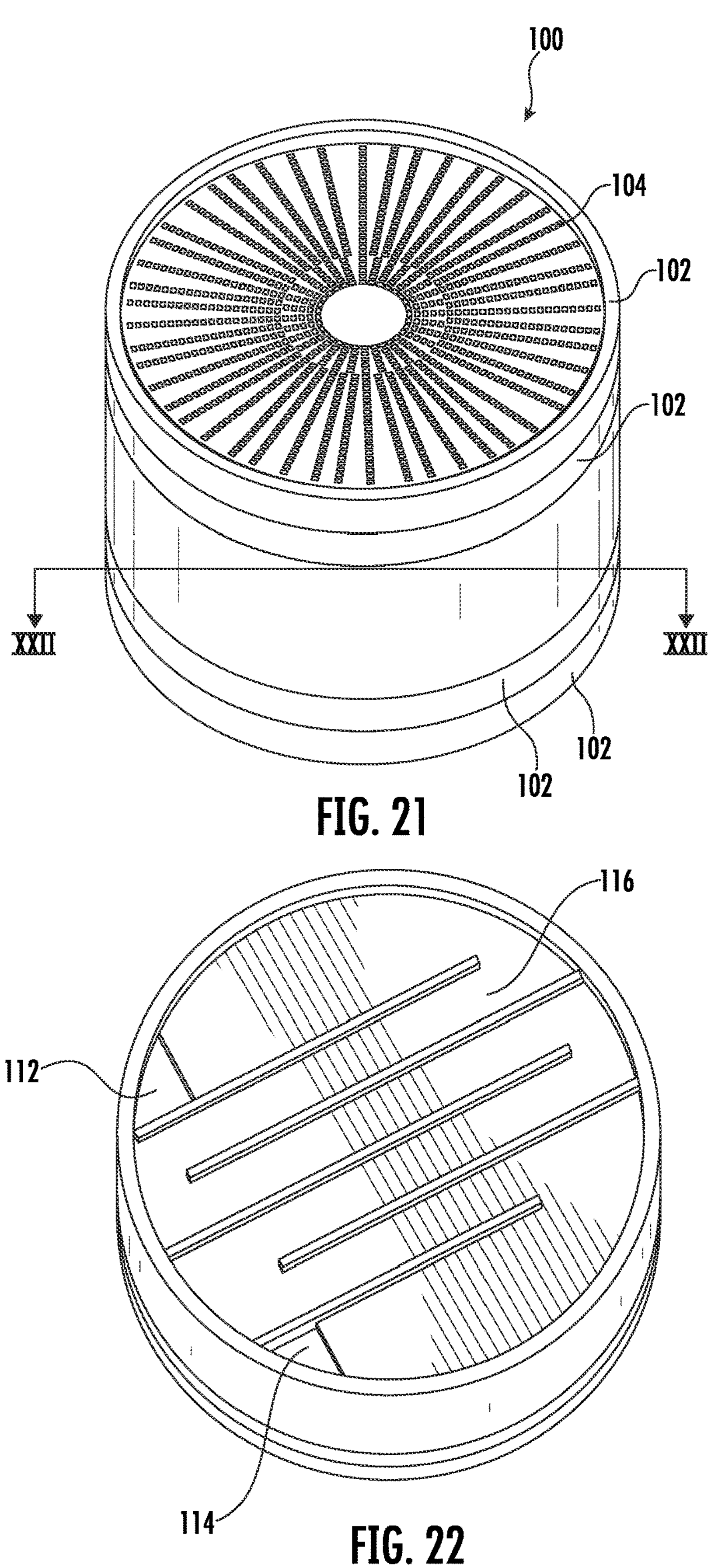
FIG. 21 is a perspective view of a cartridge according to yet another aspect of the present disclosure.
FIG. 22 is an enlarged view of one of the layers contained within the cartridge shown in FIG. 21.
Figure 23:
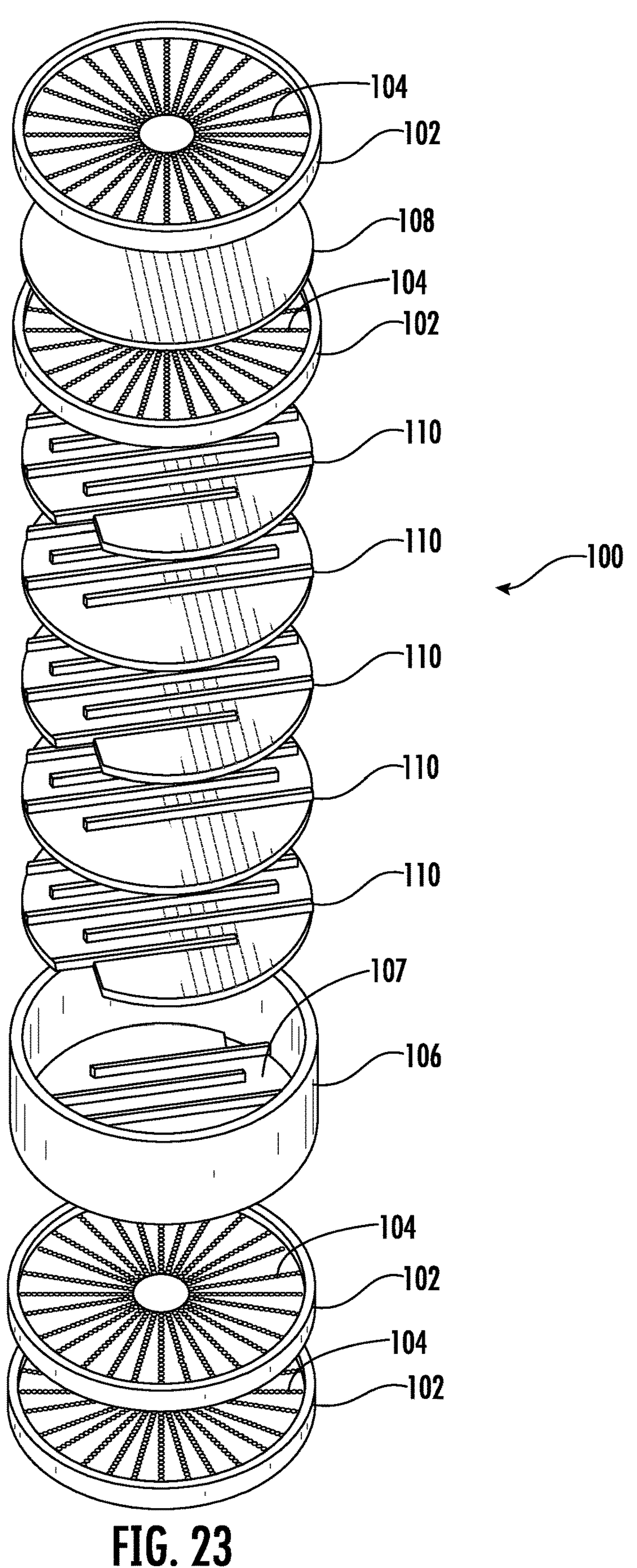
FIG. 23 is an exploded view of the cartridge of FIG. 21.
Figure 24:
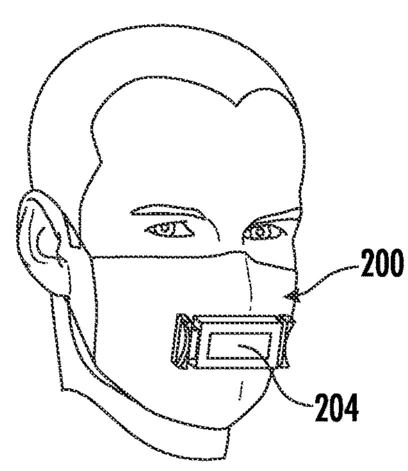
FIG. 24 is a perspective view of a cuboidal-shaped entrainment filtering cartridge engaged to a face mask according to an aspect of the present disclosure.
Figure 25:
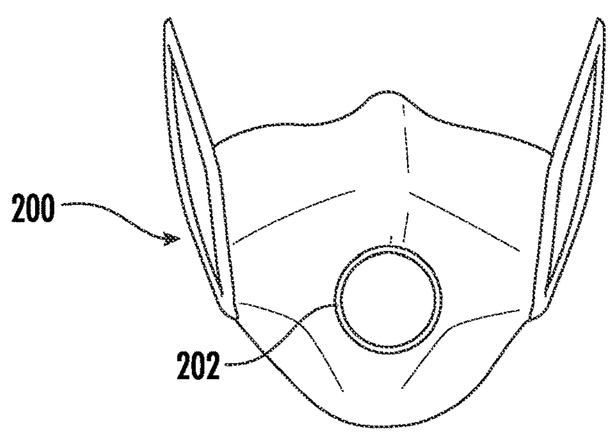
FIG. 25 is a perspective view of a mask having a circular, threaded attachment cavity for engaging a cylindrically shaped entrainment filtering cartridge according to an aspect of the present disclosure.
Figure 26:
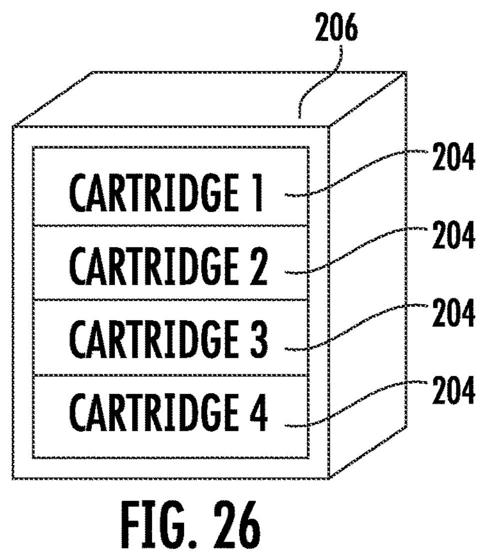
FIG. 26 is an exemplary multiple cartridge carrying assembly.

FIGS. 21-23 show another exemplary embodiment of a cartridge 100 of the present disclosure. The cartridge 100 includes two mesh plates 102 at each end of the about 2.5 inch high and about 3 to about 3.3 inch diameter cartridge. The mesh plates have a plurality of apertures 104 therein and hold a polypropylene nonwoven fabric 108 between them. There is also typically a cylindrically shaped side wall portion 106 that may have a bottom portion 107 or not. If the bottom portion 107 is present, the bottom portion 107 and the plurality of layers 110 each have a maze pattern 116 therein such that when combined in the composite cartridge, a tortured airflow pathway is formed. Contained within the maze formed within the cartridge are 2 mm diameter entrainment substrates, typically boron-modified polystyrene beads or polyhydroxylated particles or other polar materials that are optionally coated with a non-volatile liquid or a bifunctional chemical such as gluconic acid or ascorbic acid in solid or liquid form or other such coatings and mixtures thereof discussed herein. The layers have a total path length of at least about 73 inches in this aspect of the present disclosure. A cross-section of this cartridge of the present disclosure is meant to hold the coated beads/prills creating one layer thick of beads. There are two holes 112 and 114 in each of the layers 110 to allow airflow between layers of the cartridge. The cross-sectional view (FIG. 22) is the view taken along lines XXII-XXII in FIG. 21. Differently sized beads may be used, the amount of bead layers may be increased and the airflow rate may be increased or decreased.

In a particular aspect of the present disclosure, a canister containing an entrainment system may be engaged in an airtight manner to a mask in a manner that forces potentially contagion containing air. In the context of the mask shown in at least FIGS. 24-34, the mask or facial covering 200 will contain a cavity or port 202 that will receive a cartridge or canister 204. When the cartridge is being engaged within the cavity or port 202, the cartridge is typically engaged with the mask in an at least substantially air tight and more typically in an air tight manner that ensures that substantially all or all of any contagion containing air or potentially contagion containing air must travel through the cartridge containing an entrainment system according to any aspect of the present disclosure. The cartridge and cavity can be of essentially any matching shapes, but are typically either a cuboid or a cylindrical shaped exterior housing. So long as the engagement and construction forces the air being breathed in and also typically out of the mask through the cartridge, the shape and configuration can be of any volume.

The shaped canister has a path inside which establishes one or more air pathway(s) of the entrainment system within the cartridge. The general concept is a "squeeze and twist" engagement system approach to the canister, very similar to one utilized by child-proof medicine bottles. The cannister is squeezed on its sides prior to twisting or placing the canister into engagement with the cavity or docking frame that may elevated such that it extends above the exterior surface of the mask or be recessed/seated within or otherwise incorporated into the covering layer of the mask. The cartridge will typically have some mechanical mechanism that requires a force to be applied to it in order for it to be opened. Typically, this will require squeezing the sides of the container prior to twisting or otherwise engaging the cartridge with the cavity. Similarly, when closing, the user can feel and typically also audibly hear the lid clicking indicating to the operator that the device is sealingly and properly engaged. The squeeze attachment mechanism prevents the possibility of the canister loosening and detaching over time decreases significantly. It becomes a locking mechanism, rather than a simple attachment mechanism. This type of attachment mechanism also prevents error in engagement by the user by providing a hear/feel "click" when the device is fully and properly attached and locked. This means that the canister is fully attached only when the user hears and/or feels the click. This prevents the misattachment of the entrainment device significantly and therefore lessening the possibility of error and infection due to misuse.

The cartridges may be stored and/or transported in a housing 206 as a series of stacked or otherwise aligned cuboid cartridges 204 in one set similar to replacement razor blade cartridge containers. The housing 206 could also serve as a disposable dispenser; in other words, once the user has used a cartridge to its maximum and wishes to replace it for a new one, he/she can simply put it back in the housing and get a new one. This process can be repeated until all cartridges are used, and then dispose of the housing 206 as a whole.

Figure 27:
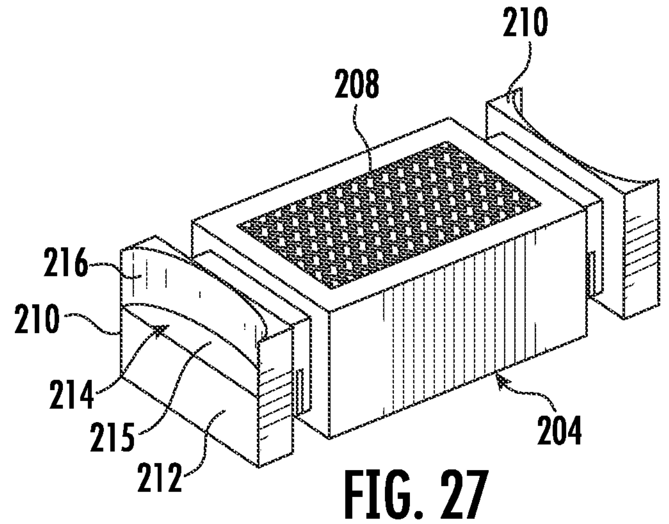
FIG. 27 is perspective view of a cuboidal-shaped entrainment cartridge with squeezable attachment side sections according to an aspect of the present disclosure.
Figure 28:
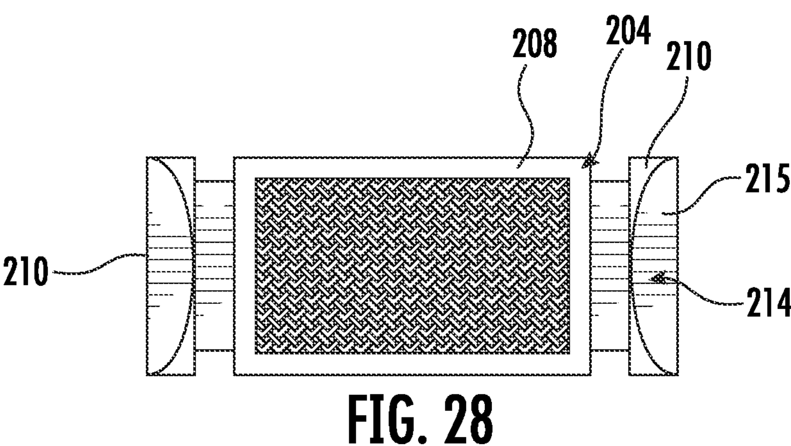
FIG. 28 is a top view of the cuboidal-shaped entrainment cartridge with squeezable attachment side sections according to an aspect of the present disclosure.
Figure 29A:
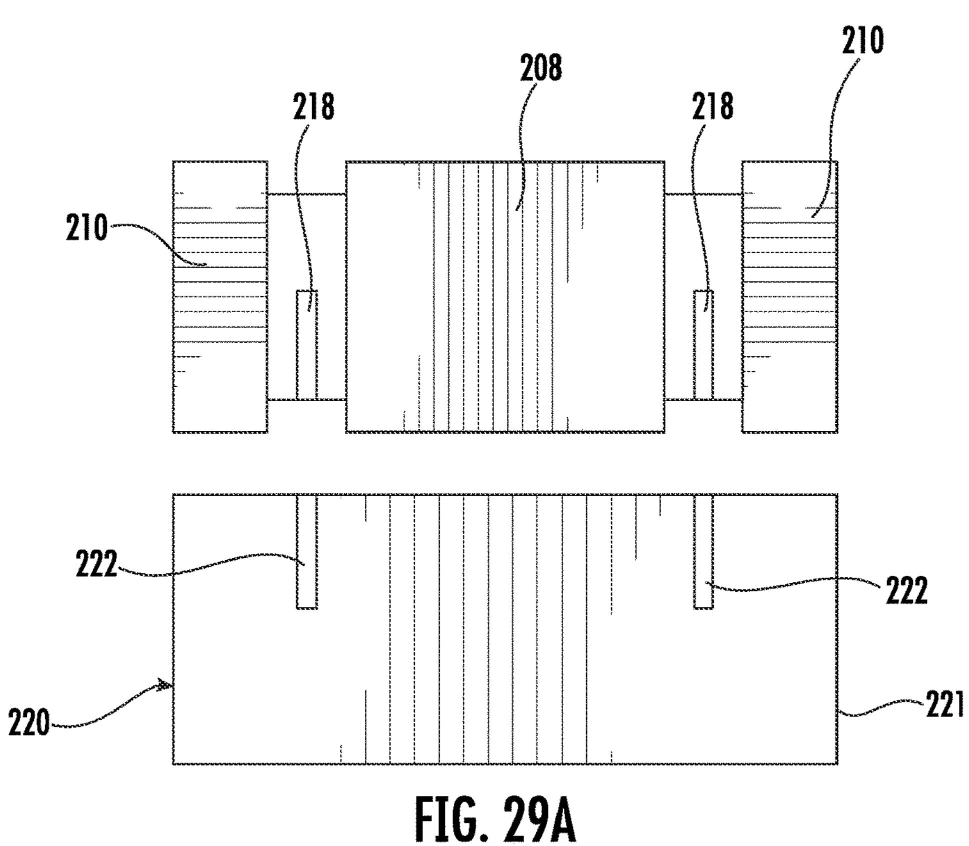
FIGS. 29A-E schematically show the steps at various stages for the attachment of the cuboidal-shaped entrainment cartridge with squeezable attachment side sections with a corresponding cavity of a user's mask.
Figure 29B:
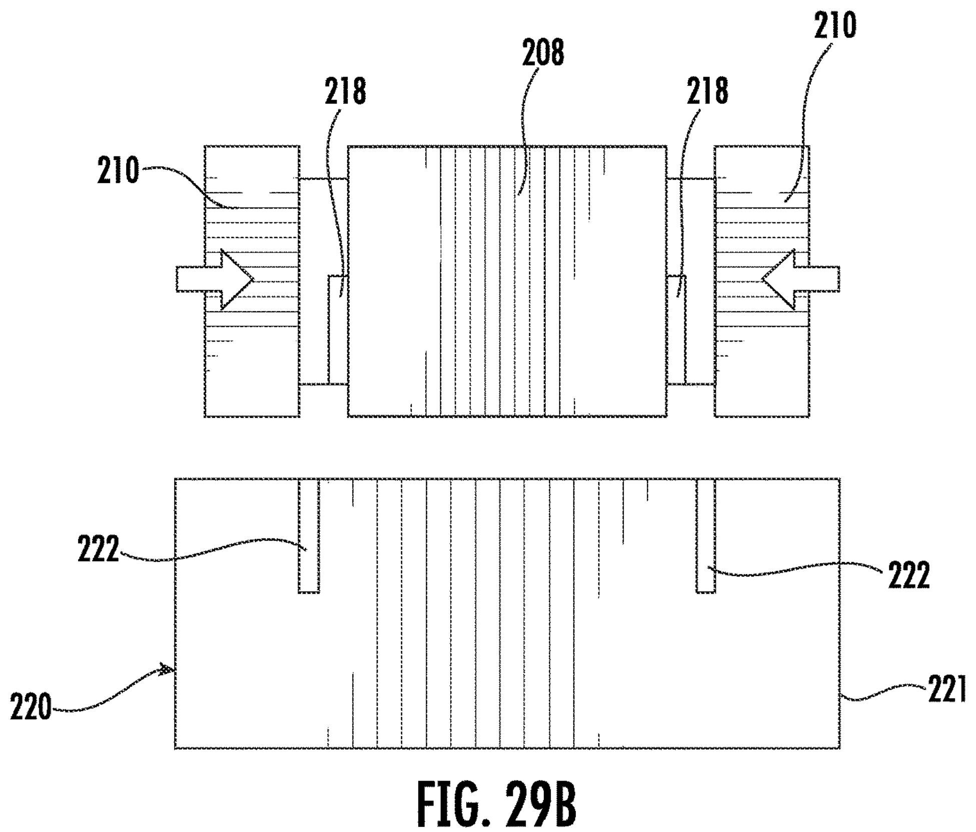
Figure 29C:
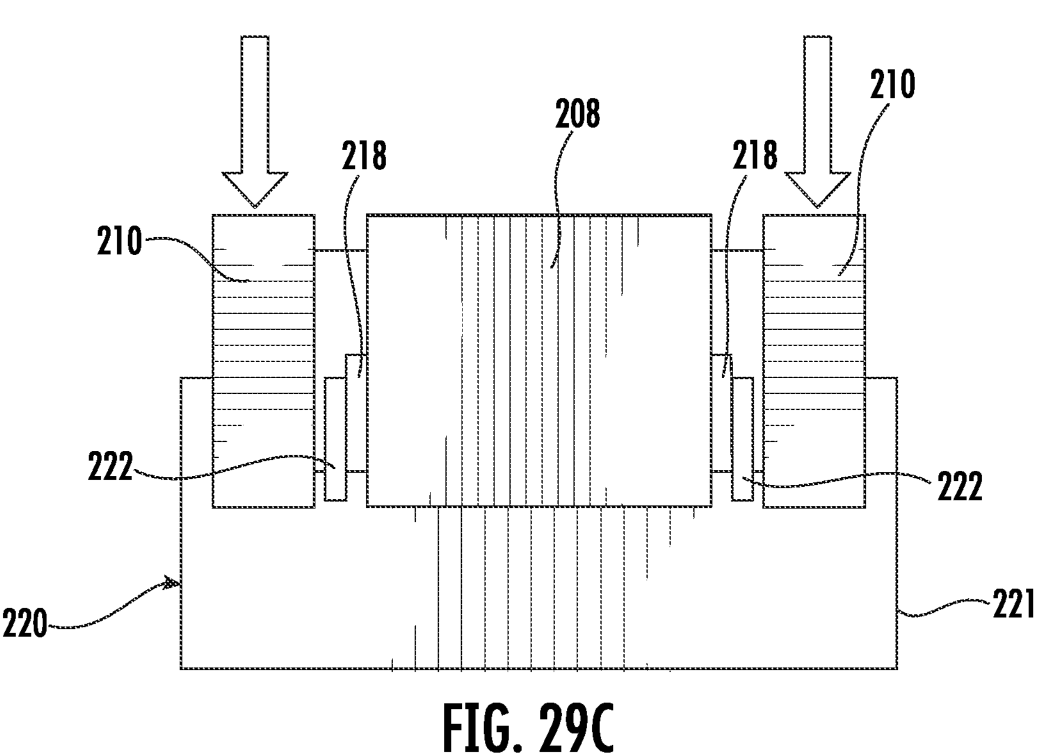
Figure 29D:
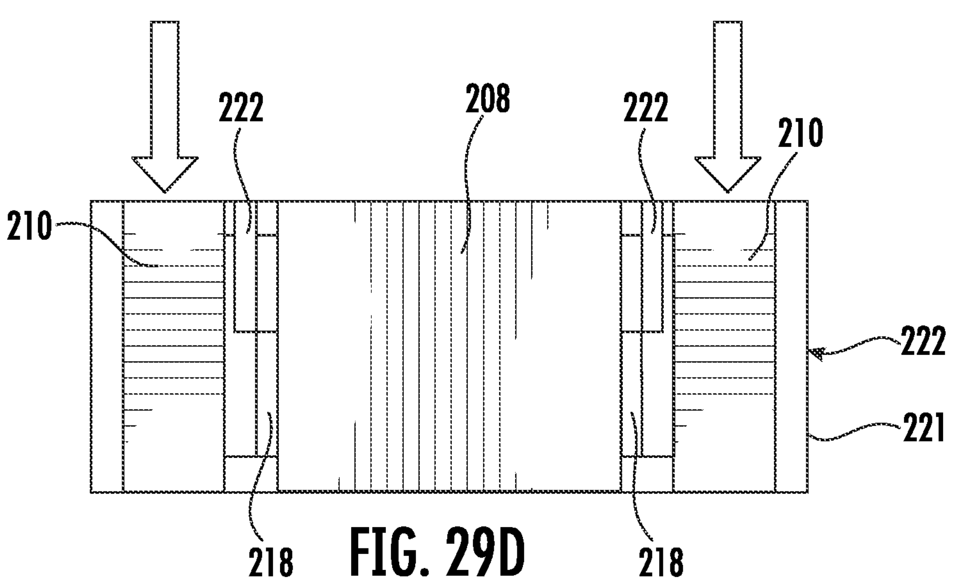
Figure 29E:
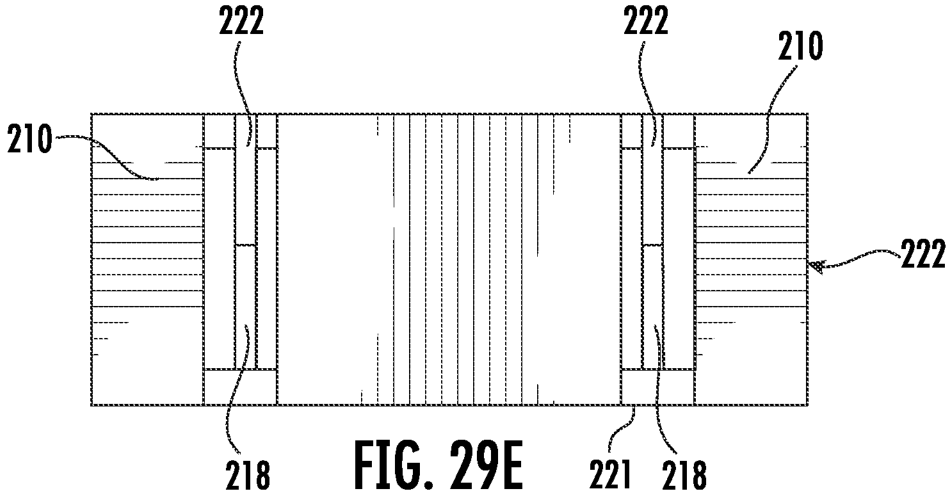
Figure 30:
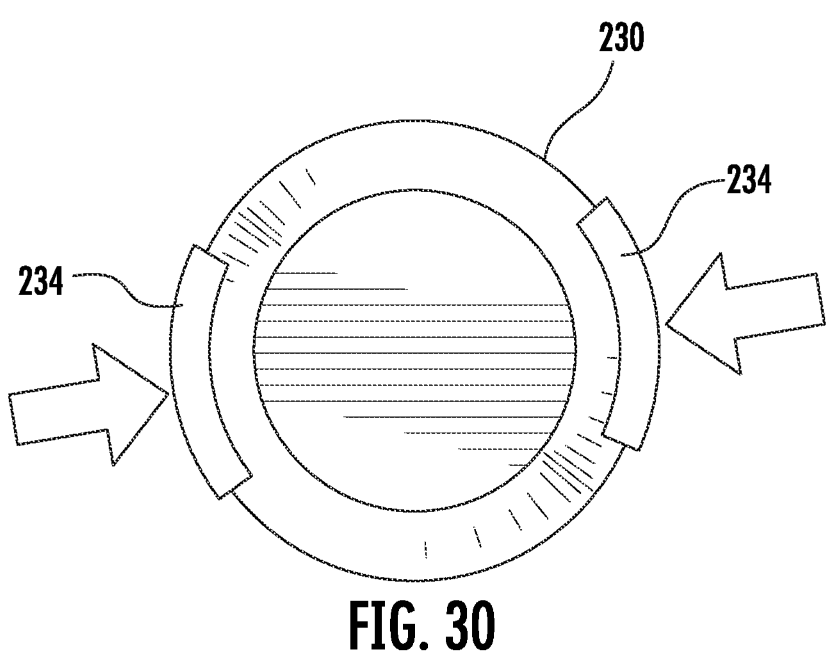
FIG. 30 is a front view showing a cylindrically-shaped entrainment cartridge with squeezable sides to allow engagement of the cartridge with a mask's cavity having a circular cross-section.
Figure 31:
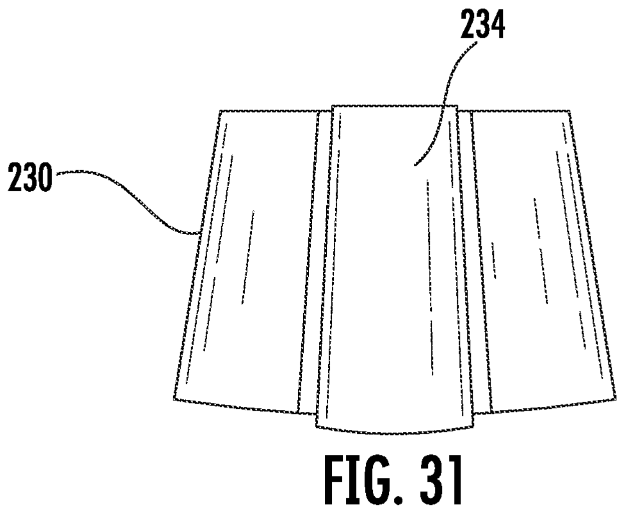
FIG. 31 is an elevated side view of the entrainment cartridge shown in FIG. 30.
Figure 32:
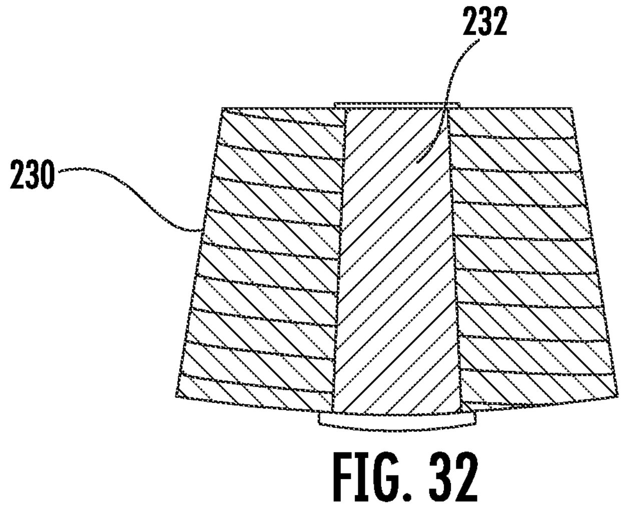
FIG. 32 is an interior view of a cylindrically-shaped entrainment cartridge according to an aspect of the present disclosure.
Figure 33:
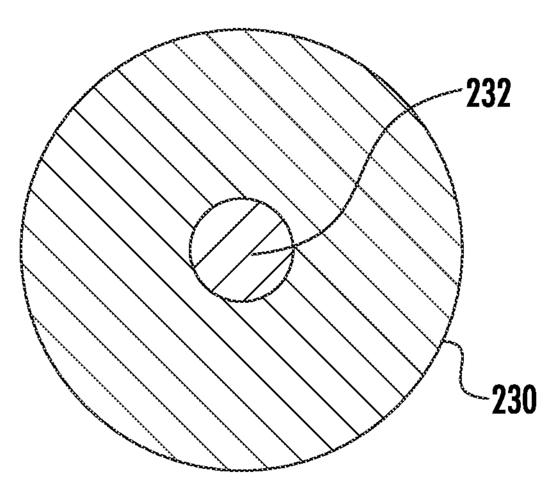
FIG. 33 is a top interior view of a cylindrically-shaped entrainment cartridge according to an aspect of the present disclosure.

As shown in FIGS. 27-28, the cuboid-shaped cartridge of the present disclosure will typically have a main housing section 208 and at least one set of two opposing squeezable end sections 210, which are spring biased outward by springs within the interior of the cartridge. The majority of the interior volume of the main housing section 208 has the entrainment systems within it, but there is some volume that allow the smaller end sections 210 to move to a position within the end of the main housing section 208. The smaller end sections 210 also have a wall or other locking element 218 that is typically elongated and planar. The end sections 210 each also typically have an outermost planar surface 212 and a finger-receiving space 214. The finger receiving space 214 is a cut-out on the outer facing surface of the end section 210 that facilitates the fingers' ability to squeeze the two end sections 210 together. The finger receiving space typically has finger receiving walls 216 that form a concave shape and a bottom surface 215.

FIGS. 29A-29E show the installation process of the cartridge into engagement with a cavity within a mask. The cavity 220 will typically have a rigid perimeter section 221 and at least two static typically parallel walls 222, but may have two sets or at least a plurality of walls 222. The cartridge's wall 218 typically only goes as high in the device as the midpoint (height-wise—starting from the bottom) of the part. The dimensions of the cavity are designed and configured to be almost exactly the same as the uncompressed cartridge device (both length and height) thus creating a near perfect attachment. The cavity's wall 222 on the cavity aligns with the wall 218 of the cartridge on the decompressed device. The difference however is that the cavity wall 222 starts on the midpoint of the cavity (height-wise) and typically extends all the way to the top of it. As shown in FIGS. 29A-29E, when the sides of the cartridge are decompressed it will not enter or leave the cavity because the "walls" on both device and cavity will be aligned; however, when the sides of the cartridge are compressed, the device's "wall" will shift inward towards the main box and create a gap that will allow it to go inside the cavity. Finally, when the device is inside the cavity and its sides are released, the "wall" will be biased to return to its previous and original spot (which is perfectly aligned with the cavity's "wall") and lock the device inside the cavity without the risk of it coming off. Finally, when the user wishes to remove the device from the cavity, all he/she has to do is squeeze the side ends of the device just as previously done to attach it, and remove it.

Similarly, the entrainment system and attachment cavity may have a cylindrically shaped housing 230 as shown in FIGS. 25 and 30-33. The exterior will typically have two opposing depressible side sections 234 that allow the housing to be threadedly engaged with receiving threads on the interior surface of the cavity of the mask when the cavity has a circular cross-section. The entrainment system utilized within the housing may be any shape or configuration of entrainment system discussed herein so long as it established the appropriate residence time necessary to entrain the amount of viral particles desired; however, one air pathway structure that may be utilized in the cylindrically shaped housing is a cocentritic spiral pathway much like a gumball dispenser. The spiral air pathway typically run around a central axis/post 232, which is typically solid and cylindrically shaped as well, to provide support for the air pathway channel. As shown in in the context of the present disclosure, the entrainment system may be established by air coming in through a boundary layer and traveling a spiral pathway down.

Figure 34:
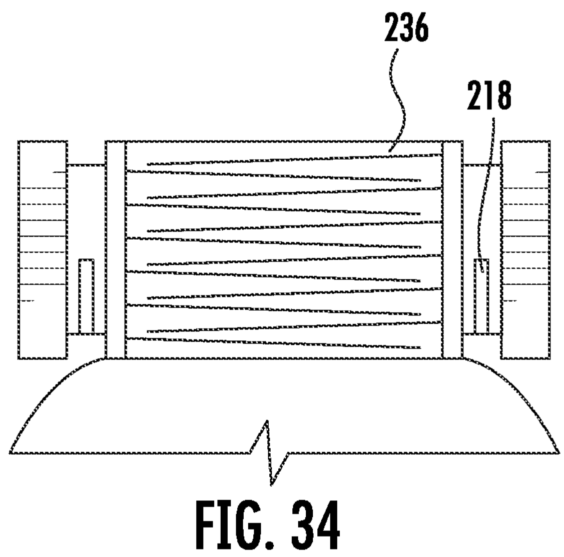
FIG. 34 is a schematic interior view showing the entrainment system's zig-zag airflow pathway according to an aspect of the present disclosure.
Figure 35:
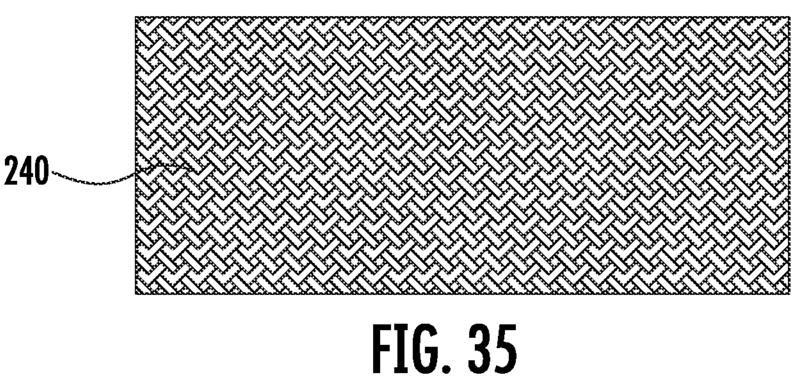
FIG. 35 is a front elevational view of a chemically coated non-woven layer of an entrainment-based system according to an aspect of the present disclosure.
Figure 36:
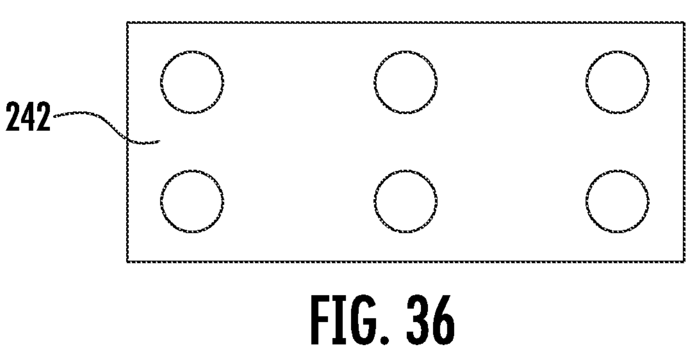
FIG. 36 is a front elevational view of an apertured layer according to an entrainment-based system according to an aspect of the present disclosure.
Figure 37:
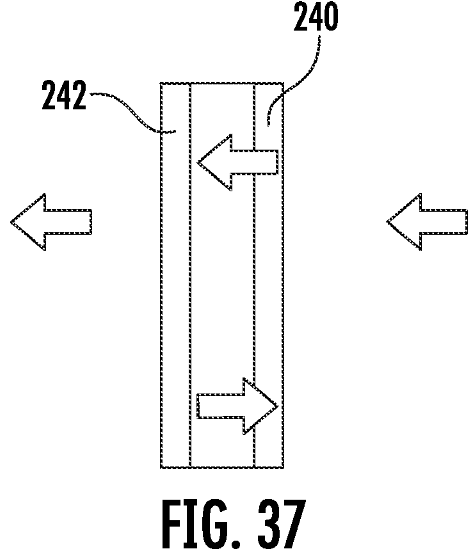
FIG. 37 is a schematic view of a pair of chemically coated non-woven layer and an apertured layer showing airflow therethrough.
Figure 38:
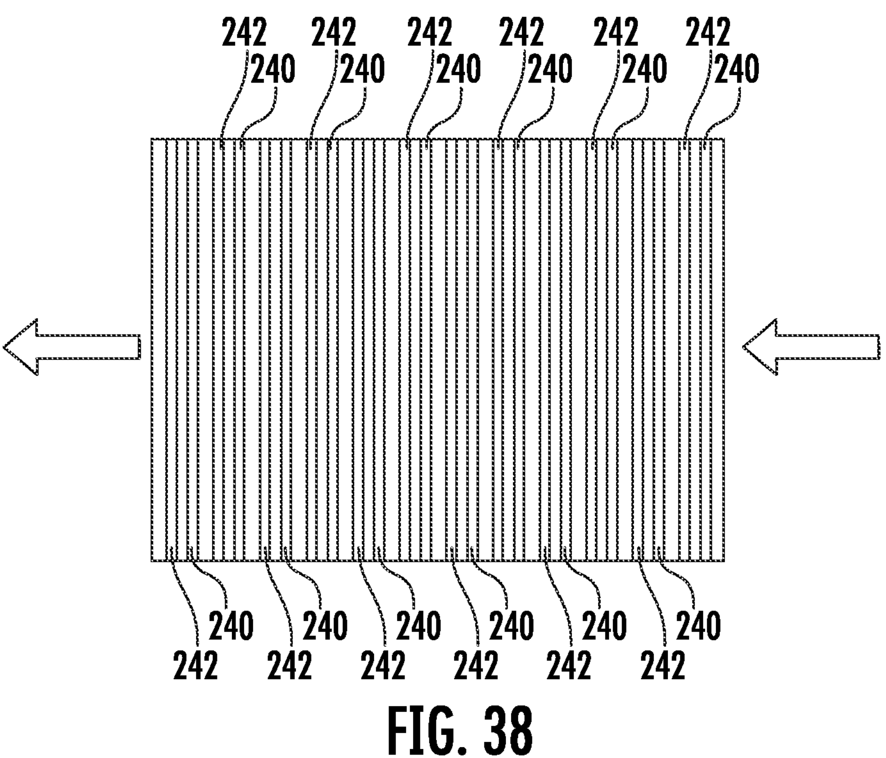
FIG. 38 is a schematic view of a series of pairs of chemically coated non-woven layers and apertured layers used together to create a filtering cartridge according to an aspect of the present disclosure.

As shown in FIG. 34, the entrainment system inside the cylindrical housing or the cuboidal-shaped housing can also be one that follows a zig zag pathway 236 that forces air and viral particles in the air traveling along the pathway to touch each and every chemically coated surface on the device before actually being in contact with the user. All of the cartridges discussed herein are typically designed with a small dimensional tolerance compared to the devices themselves, creating a tight fit, which could be pleasing and convenient for the consumer to hold in his/her hands, place it in their pockets, or even set it in a certain surface. By having a small dimensional tolerance, the devices stay in place until the user decides to take them out of the cartridge for usage.

In addition to the entrainment-based interior systems discussed above, the entrainment-based systems can be constructed to create a straight line looping system while still accomplishing entrainment of contagions. As shown in FIGS. 36-39, the entrainment system of the present disclosure may include a series of spaced apparat apart layers where one of the layers is a layer of chemically coated non-woven fibers 240 and the other layer is a layer with a plurality of apertures that allow airflow through. The layer containing apertures/holes 242 is typically constructed from a solid air impermeable and can be a surface made out of a film, or a solid surface with a certain amount of holes in it which allow some of the air to pass but also makes some of the air bounce back into the alpha layer, causing the air to go through the previous "filter" once more. The apertured layer 242 is typically placed right after the chemically coated non-woven fiber layer 240 to form a single bundle and the entire filtering system will typically consist of a series of multiple bundles sufficient to provide the residence time necessary for any desired level of contagion. The more layers of bundles, the more residence time and the greater the level of contagion entrainment.

Typically, the attachment system for this concept will simply be a rectangular plastic cartridge that the user will slide inside of a cavity present in the mask, very similar to the mechanism discussed above; however, while the concept discussed above employs a squeezable side to the cartridge which allows it to go in and out of the cavity, in this case, the locking mechanism may be created simply by having tight dimensional tolerances between the cartridge and the cavity, making it a tight fit to lock the cartridge in the mask's cavity. Of course, the above squeezable connection system could also be used.

In operation, as air contacts the alpha layer, the chemically coated layer acts as a filter for any viruses contained in the air that flows through the layer. By having a non-woven pattern of chemically coated fibers, the path in which the air goes through in the alpha layer is somewhat random and could therefore increase surface contact, which eliminates more virus molecules. As the air leaves the chemically coated layer the air then encounters the apertured layer. The apertured layer's function is to act like a "wall" and cause some of that air flowing through to bounce back and return to previously encountered alpha layer. This creates a loop that forces the air to be filtered more than once by the same layer. However, the apertured layer has holes in it in order to allow some of the air to flow through freely, only to encounter the next alpha layer and repeat the process multiple times.

The bundles of paired layers are typically placed in series. By doing so, the air will travel in a looping pattern causing the air to be filtered so many times that it will be possible to achieve the desired 99% or greater, or 99.99% virus capturing. By the time the air reaches the user's end the air will be essentially completely free of viruses.

According to this aspect of the present disclosure a traditional cloth mask can be treated with antiviral or anti-contagion treating chemical such as gluconic acid or ascorbic acid or other components as discussed herein. Additionally, many cloth masks are designed with two layers of cloth or non-woven material. An opening may be constructed in the inner layer to form a pocket. The pocket can receive an absorbent pad. The pad 246 may be about 2.5" high×4" long and ½" thick. The pad may have a central opening 248 that is about ¾" to 1" diameter that allows air to enter the pad. Inside, the air is immediately diverted by 90 degrees and passes through a packed bed of entrainment beads as discussed herein. Air passes around a non-transmissive barrier positioned in the center of the pad that forces air laterally and around the non-transmissive barrier forcing the air to thereafter pass through a second packed bed of entrainment beads before converging to a second central opening on the other side of the pad that is about ¾" to 1" diameter or more typically, to a pair of laterally oriented non-woven covered openings 250 on each side of the mask.

Figure 39:
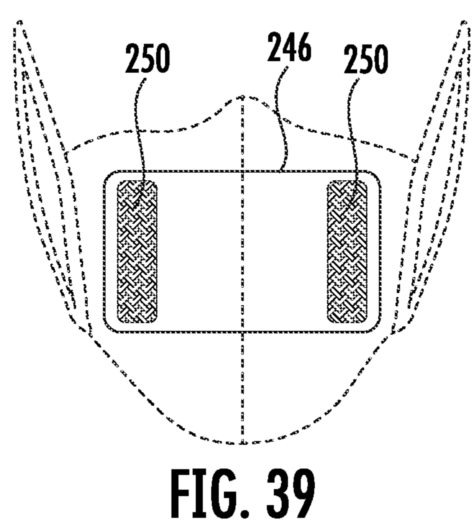
FIG. 39 is a front schematic view of a mask incorporating an entrainment pad according to an aspect of the present disclosure.
Figure 40:
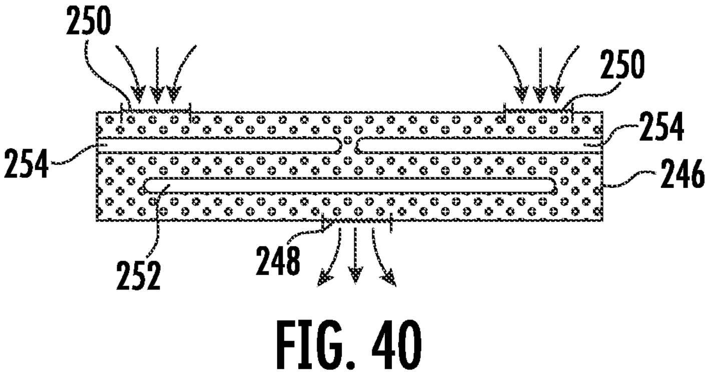
FIG. 40 is an elevated side schematic view of an entrainment pad insert according to an aspect of the present disclosure.
Figure 41:
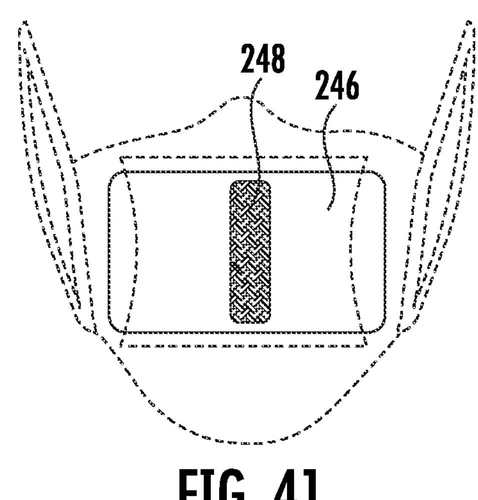
FIG. 41 is an elevated back schematic view of a mask incorporating an entrainment pad according to an aspect of the present disclosure.
Figure 42:
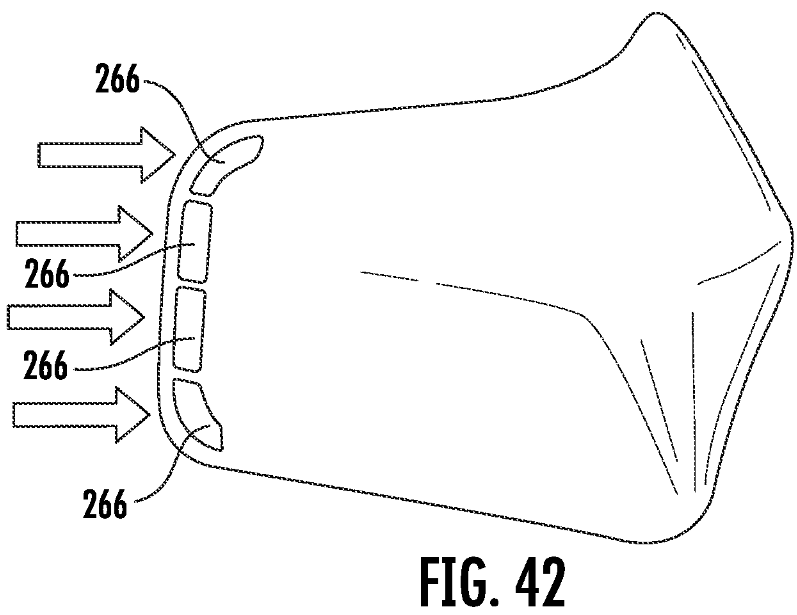
FIG. 42 is a perspective view of a mask having side air inlet/outlets according to an aspect of the disclosure.
Figure 43:
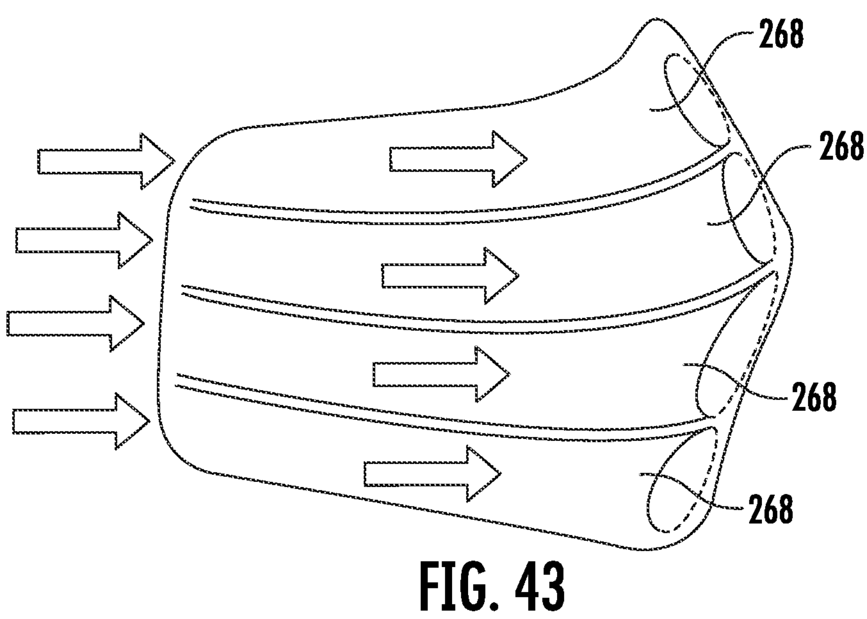
FIG. 43 is a schematic view of the interior airflow pathways of the mask shown in FIG. 42.
Figure 44:
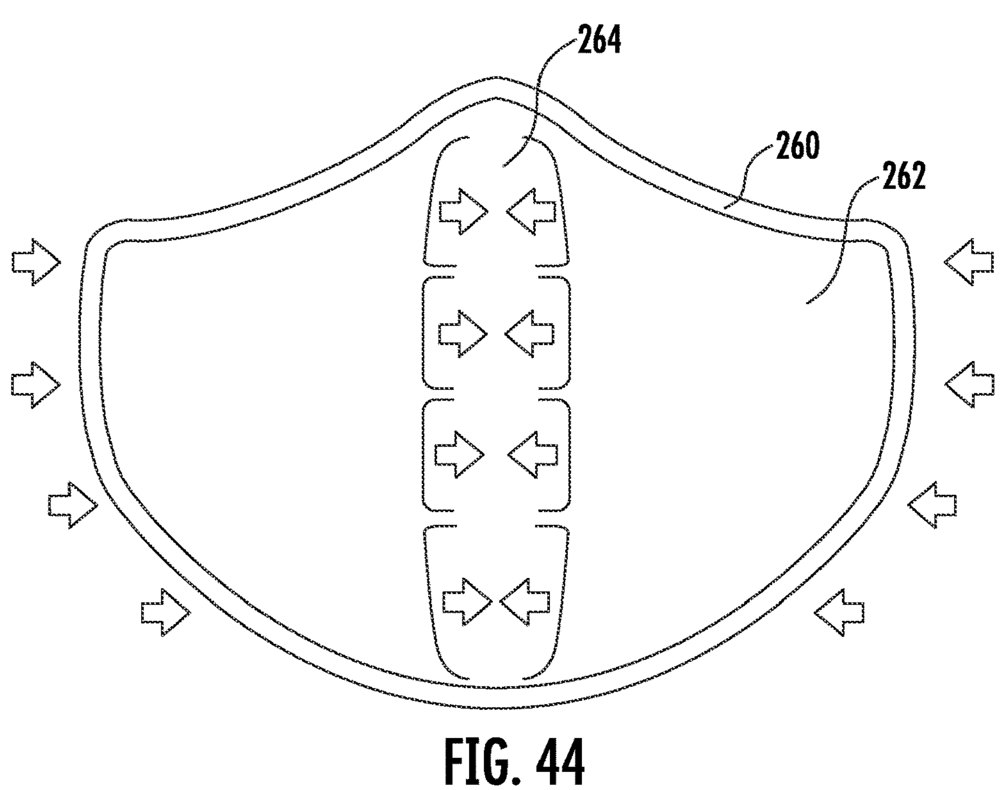
FIG. 44 is an elevated back view showing the rearward facing air inlets/outlets of the mask shown in FIG. 42.
Figure 45:
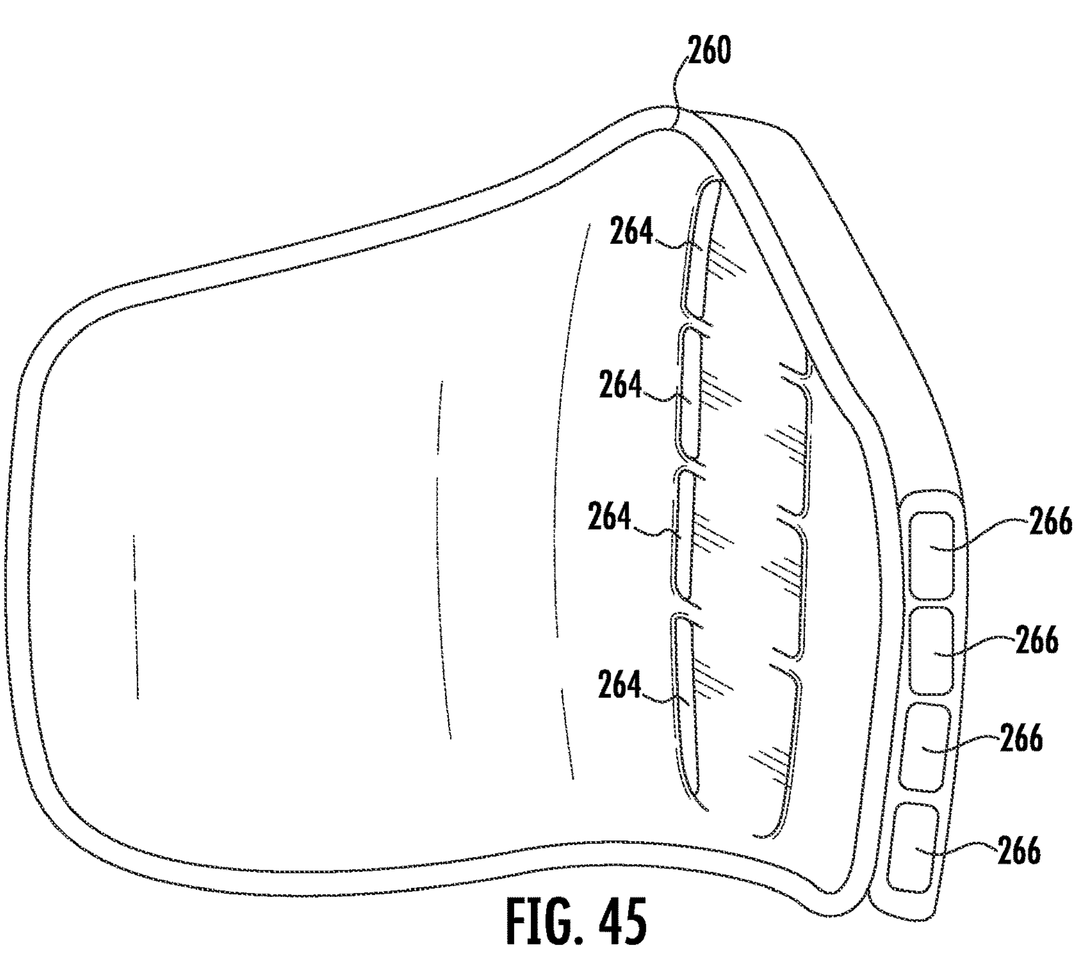
FIG. 45 is a rear perspective view of the mask shown in FIG. 42.

In an alternative embodiment of the pad shown in FIGS. 39-41, the design to force an air pathway that makes a plurality of and typically at least three 90 degree turns which will cause a large portion of droplets in exhaled air to fail to escape the mask at velocity that results in the droplets crossing any meaningful distance. The pad may contain a centrally located wall 252 and at least two substantially aligned lateral walls 254 within an entrainment system according to the present disclosure. Additionally, because of the effectiveness of the pad at capturing both droplets and viruses without high pressure drop, the cloth material used to make the face mask can be made thinner and more breathable. The overall result is a face mask that does a much better job capturing and retaining both droplets and viruses with much lower pressure drop, which results in a mask that incorporates the entrainment technologies disclosed herein in a mask or system that is more comfortable to wear for a user.

According to another aspect of the present disclosure, as shown in FIGS. 42-45, the mask can be constructed such that it is sealingly engaged using a flexible material 260 around the interior/user facing side of the perimeter of the mask to create an at least substantially if not entirely air tight seal. Instead of air entering and exiting from the front of a mask, it forces air to enter and exit from the sides. The mask may also include one or more entrainment systems within the airflow pathway(s) disclosed. The mask shown in FIGS. 42-45 has one or more air inlets/outlets 264 on a central area of the user facing side 262 which allow for easier breathing by the user while also having corresponding air inlets/outlets 266 on the sides of the mask. There between are airflow pathways/channels 268 that may or may not contain or incorporate an entrainment-based filtering system(s) as discussed above in the context of the present disclosure. The construction of the air inlets/outlets and their locations and orientation has at least two benefits. First, regardless of how well the mask traps viruses, exhaled air is not blown into the face of a person the wearer is talking to, nor is air inhaled proximate to the person a person is talking with while wearing the mask. Second, warm, moist air that easily fogs glasses or a face shield is not forced to exit the mask where it immediately drifts upward and fogs glasses. Instead, it exits to the sides and toward the ears where it does not fog a mask or face shield.

If desired, the ventilation device can be attached to the regular fabric mask or other portable masks and stuck in between human skin and the cloth mask. The ventilation device can also be placed inside the fabric mask, which is in between the fabric layers, but fabric needs cutouts at the inlets of the ventilation device for airflow.

However, the ventilation device does not need to be attached with a fabric mask to work. Ideally, the ventilation device may be attached with elastic loops on both sides' ends to become the mask itself.

Figure 46:
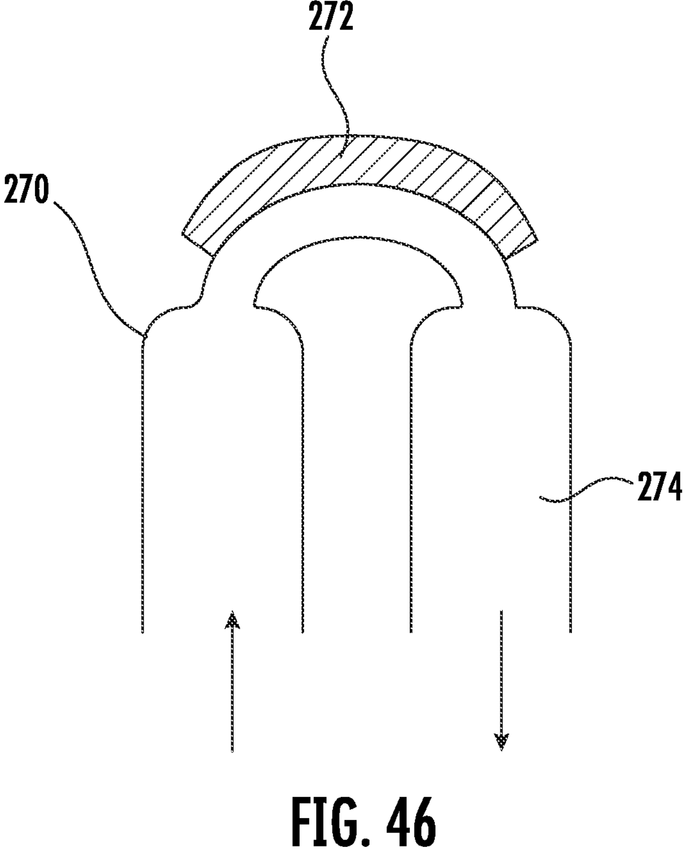
FIG. 46 is a schematic view of a nozzle and diffuser system for entrainment of virus or other contagion.

Additionally, as shown in FIG. 46, a nozzle 270 may be constructed to create an entrainment system according to yet another aspect of the present disclosure. The system shown in FIG. 46 will include nozzle 270, a diffuser 274 and a substrate 272. When air moves through the channels within a filter or mask of the present disclosure, small particles will remain entrained in the airflow and follow the path of the airflow. Smaller particles suspended in the airflow have less inertia and will follow the path of the airflow when the direction of the airflow changes. When a particle has enough inertia, when the airflow changes direction the particle will fall out of the airflow. Larger or faster moving particles will have more inertia and be less likely to follow the path of airflow when changing direction. If the cross-sectional area of the channel decreases before a change in airflow direction, the velocity of the flow will increase causing the particles suspended within the airflow to increase and make them less likely to follow the airflow path when the airflow changes direction. This can cause the particles to collide with the substrate's surface that is positioned to surround a turn or bend. If that surface is a substrate that will absorb the particle, the particle will be removed from the airflow. This also means that the substrate only needs to be applied in areas surrounding where the airflow changes direction, which will reduce the cost and manufacturing of the filter. Further, the entire airflow channel does not need to be completely filled, which decreases the resistance of the filter. In this concept, a "nozzle" is applied before each airflow direction change and a "diffuser" is applied just after each airflow direction change.

This additional concept is presently believed to be particularly useful when viruses are contained in tiny water droplets, which is usually the case for viruses that are exhaled from an animal carrier, in particular a human. When viruses are contained in tiny water droplets, the mass of the droplet is such that the droplet has enough inertia that it will tend to be slung out of the path of the airflow when rounding sharp corners at high speed. When slung out of the airflow path, the massive droplets will collide with the outside sidewall of the pathway. If the sidewall is coated with a material that is sticky to the virus (like ascorbic acid or a thixotropic fluid as previous described) the viruses will be captured. If a pathway is built that contains a plurality of 180 degree turns, each with a nozzle that speeds up the airflow as it rounds the 180 degree corner, followed by a diffuser that slows the airflow again along the straightaway following the 180 degree corner, substantially all of the viruses in tiny water droplets will be captured.

What is claimed is:

1. An entrainment-based air filter comprising:

a housing defining an interior volume comprising at least one airflow pathway having an airflow pathway length spaced within the interior volume; and a plurality of entrainment beads that are substantially free or free of pores capable of filtering by entrapping particulates wherein the plurality of entrainment beads is within the at least one airflow pathway; and wherein the plurality of entrainment beads and the dimensions of the at least one airflow pathway work together to establish a residence time within the housing sufficient to entrain particulates on a surface of the plurality of entrainment beads by adsorption or absorption of the particulates and thereby prevent at least 95% of particulates traveling through the at least one airflow pathway from exiting the entrainment-based air filter.

2. The entrainment-based air filter of claim 1, wherein the plurality of entrainment beads all comprises the same type of inert material and the entrainment-based air filter is a threaded cartridge configured to be engaged with a threaded attachment location of a facemask.

3. The entrainment-based air filter of claim 1, wherein the plurality of entrainment beads is free of pores greater than 50 nm in size and are free of any coating thereon and the particulates comprise a virus having a size of about 0.3 microns or smaller.

4. The entrainment-based air filter of claim 3, wherein the plurality of entrainment beads is free of pores greater than 2 nm in size and are free of any coating thereon.

5. The entrainment-based air filter of claim 1, wherein the entrainment-based air filter is free of any activated carbon, activated alumina, silica gel or zeolites and the entrainment-based air filter does not utilize entrapment-based or irradiation-based systems to capture or eliminate virus traveling within the at least one airflow pathway during use.

6. The entrainment-based air filter of claim 1, wherein the at least one airflow pathway is a plurality of airflow pathways and the plurality of entrainment beads is chosen from the group consisting of boron-modified polystyrene beads and polyhydroxylated particles.

7. The entrainment-based air filter of claim 1, wherein the at least one airflow pathway comprises at least two spiral-shaped airflow pathways that are within the interior volume of the housing and concentric with one another about a central axis that runs the length of the housing and wherein the plurality of entrainment beads are coated with a non-volatile liquid or a bifunctional chemical chosen from the group consisting of gluconic acid and ascorbic acid in solid or liquid form.

8. The entrainment-based air filter of claim 7, wherein the housing is a cylindrically shaped housing and the entrainment-based air filter further comprises a composite panel affixed to a top of the at least one airflow pathway and the plurality of entrainment beads form at least one packed bed layer of entrainment beads.

9. The entrainment-based air filter of claim 7 further comprising a composite panel affixed to an opposite end of the at least one airflow pathway and wherein the composite panel affixed to the top of the at least one airflow pathway and the composite panel affixed to the opposite end of the at least one airflow pathway each comprise a non-woven sandwiched between two layers of fabric material chosen from the group consisting of a spunbond material, a hydroentangled spunlace material, a melt blown material, a spunbond/melt blown/spunbond laminate material, and an air-laid material.

10. The entrainment-based air filter of claim 7, wherein the plurality of entrainment beads is positioned within each of the at least two spiral-shaped airflow pathways.

11. The entrainment-based air filter of claim 10, wherein the entrainment-based air filter eliminates at least 99% of virus that are smaller than 0.3 microns in size that pass through the entrainment-based air filter during use by a human.

12. The entrainment-based air filter of claim 1, wherein the plurality of entrainment beads is coated with a material chosen from the group consisting of a surfactant, a non-volatile liquid and a bifunctional chemical component.

13. The entrainment-based air filter of claim 1, wherein the plurality of entrainment beads is coated with a bifunctional chemical component that bonds to the plurality of entrainment beads and a virus and wherein the plurality of entrainment beads are inert and the plurality of entrainment beads do not have pores.

14. The entrainment-based air filter of claim 1, wherein the plurality of entrainment beads is coated with a hydroxylated carboxylic acid.

15. An entrainment-based filter comprising a housing defining an interior volume having at least one airflow pathway having an airflow pathway length that is longer than the length of the interior volume and spaced within the interior volume; and a plurality of entrainment substrates that are at least partially coated with a coating composition and positioned within the at least one airflow pathway; wherein the plurality of entrainment substrates and the dimensions of the at least one airflow pathway work together to slow a flowrate of particulates traveling within the at least one airflow pathway proximate the plurality of entrainment substrates to a flowrate where the particulates are adsorbed or absorbed on a surface of the plurality of entrainment substrates; and wherein the coating composition comprises a coating chosen from the group consisting of: a non-volatile, thixotropic liquid; a polyhydroxylated carboxylic acid; sialic acid; ascorbic acid; gluconic acid; a cellulose, polyethylene glycol; an amphiphilic organoboron block copolymer poly(styreneboronic acid)-block-polystyrene, and mixtures thereof.

16. The entrainment-based filter of claim 15, wherein the entrainment-based filter eliminates at least 99% of virus that are smaller than 0.3 microns in size that pass through the entrainment-based filter during use by a human.

17. The entrainment-based filter of claim 16, wherein the at least one airflow pathway comprises at least two spiral-shaped airflow pathways that are within the interior volume of the housing and concentric with one another about a central axis that runs the length of the housing.

18. An entrainment-based filter comprising:

a housing defining an interior volume comprising at least one airflow pathway spaced within the interior volume; and a plurality of entrainment substrates that are substantially free or free of pores capable of filtering by entrapping particulates and positioned within the at least one airflow pathway; and wherein the plurality of entrainment substrates and the dimensions of the at least one airflow pathway work together to entrain particulates on a surface of the plurality of entrainment substrates by adsorption or absorption of the particulates and prevent at least 95% of particulates traveling through the at least one airflow pathway from exiting the entrainment-based filter.

19. The entrainment-based filter of claim 18, wherein the particulates comprise at least one type of airborne biological material chosen from the group consisting of a mold, *Bacillus anthracis, Mycobacterium tuberculosis*, the virus that causes SARS, Pandemic Novel Swine Origin Influenza A (H1N1), Ebola virus, and the COVID-19 virus; and wherein the at least one airflow pathway comprises at least one spiral-shaped airflow pathway spaced within the interior volume of the housing and wherein the plurality of entrainment substrates are boron-modified polystyrene beads.

20. The entrainment-based filter of claim 18, wherein the at least one airflow pathway comprises at least two spiral-shaped airflow pathways that are within the interior volume of the housing and concentric with one another about a central axis that runs the length of the housing and wherein the entrainment-based filter further comprises a first mesh plate and a second mesh plate on each side of the housing wherein the first mesh plate and the second mesh plate on each side of the housing support a nonwoven spunbond panel that fits over the first mesh plate or the second mesh plate and prevents the nonwoven spunbond panel from collapsing in the interior of the housing during inhalation.

* * * * *